(12) United States Patent
Poh et al.

(10) Patent No.: US 12,079,371 B1
(45) Date of Patent: Sep. 3, 2024

(54) PERSONAL IDENTIFIABLE INFORMATION ENCODER

(71) Applicant: T STAMP INC., Atlanta, GA (US)

(72) Inventors: Norman Hoon Thian Poh, Atlanta, GA (US); Luke Arpino, Atlanta, GA (US)

(73) Assignee: T Stamp Inc., Atlanta, GA (US)

( * ) Notice: Subject to any disclaimer, the term of this patent is extended or adjusted under 35 U.S.C. 154(b) by 323 days.

(21) Appl. No.: 17/719,975

(22) Filed: Apr. 13, 2022

Related U.S. Application Data

(60) Provisional application No. 63/174,405, filed on Apr. 13, 2021.

(51) Int. Cl.
*G06F 21/62* (2013.01)
*G06V 30/30* (2022.01)
*G06V 30/413* (2022.01)
*G06V 30/42* (2022.01)

(52) U.S. Cl.
CPC .......... *G06F 21/6254* (2013.01); *G06V 30/30* (2022.01); *G06V 30/413* (2022.01); *G06V 30/42* (2022.01)

(58) Field of Classification Search
CPC .. G06F 21/6254; G06V 30/30; G06V 30/413; G06V 30/42
See application file for complete search history.

(56) References Cited

U.S. PATENT DOCUMENTS 6,836,554 B1 12/2004 Bolle et al.
7,120,607 B2 10/2006 Bolle et al.
7,412,081 B2 8/2008 Doi
(Continued)

FOREIGN PATENT DOCUMENTS

CN 103930921 A 7/2014
EP 3065366 A1 9/2016
(Continued)

OTHER PUBLICATIONS

Wonjun Kim, Face Liveness Detection From a Single Image via Diffusion Speed Model, IEEE Transactions on Image Processing, vol. 24, No. 8, Apr. 13, 2015, pp. 2456 to 2465.
(Continued)

*Primary Examiner* — Azizul Choudhury
(74) *Attorney, Agent, or Firm* — Morris, Manning & Martin, LLP; Daniel E. Sineway, Esq.; Daniel T. Begasse, Esq.

(57) ABSTRACT

A system can include a processor in communication with a data store. The processor can obtain personal identifiable information (PII) data and segregate the PII data into two or more secondary representations. The processor can generate a plurality of co-occurrence matrices based on the two or more secondary representations. The processor can perform a convolution between each of the plurality of co-occurrence matrices and one of a plurality of Gaussian kernels, wherein each of the plurality of Gaussian kernels comprises a different width. The processor can generate a tertiary representation of the PII data by performing a linear combination of the plurality of co-occurrence matrices. The processor can generate a vector based on the tertiary representation and perform a lossy tokenization process on the vector to generate a token. The processor can store the token at the data store.

14 Claims, 15 Drawing Sheets

(56) References Cited

U.S. PATENT DOCUMENTS

| | | |
|---|---|---|
| 7,773,784 B2 | 8/2010 | Boult |
| 7,822,631 B1 | 10/2010 | Vander Mey et al. |
| 8,010,460 B2 | 8/2011 | Work et al. |
| 8,249,314 B2 | 8/2012 | Bolle et al. |
| 8,312,291 B2 | 11/2012 | Golic et al. |
| 8,316,086 B2 | 11/2012 | Ufford et al. |
| 8,457,367 B1 | 6/2013 | Sipe et al. |
| 8,510,797 B2 | 8/2013 | Kasturi |
| 8,542,879 B1 | 9/2013 | Nechyba et al. |
| 8,675,926 B2 | 3/2014 | Zhang et al. |
| 8,724,856 B1 | 5/2014 | King |
| 8,965,066 B1 | 2/2015 | Derakhshani et al. |
| 9,070,088 B1 | 6/2015 | Baveja et al. |
| 9,147,117 B1 | 9/2015 | Madhu et al. |
| 9,173,101 B1 | 10/2015 | Angelov et al. |
| 9,262,725 B2 | 2/2016 | Butte et al. |
| 9,300,676 B2 | 3/2016 | Madhu et al. |
| 9,477,828 B2 | 10/2016 | Irie |
| 9,495,588 B2 | 11/2016 | Derakhshani et al. |
| 9,521,606 B1 | 12/2016 | Costa et al. |
| 9,652,663 B2 | 5/2017 | Lau et al. |
| 9,679,212 B2 | 6/2017 | Kim et al. |
| 9,721,147 B1 | 8/2017 | Kapczynski |
| 9,838,388 B2 | 12/2017 | Mather et al. |
| 9,866,393 B1 | 1/2018 | Rush et al. |
| 10,019,561 B1 | 7/2018 | Shelton et al. |
| 10,049,287 B2 | 8/2018 | Holz et al. |
| 10,210,388 B2 | 2/2019 | Derakhshani et al. |
| 10,225,255 B1 | 3/2019 | Jampani et al. |
| 10,275,684 B2 | 4/2019 | Han et al. |
| 10,320,569 B1 | 6/2019 | Wentz et al. |
| 10,430,638 B2 | 10/2019 | Russo |
| 10,594,688 B2 | 3/2020 | Yang et al. |
| 10,628,700 B2 | 4/2020 | Puri et al. |
| 10,635,894 B1 | 4/2020 | Genner |
| 10,650,226 B2 | 5/2020 | Chu et al. |
| 10,733,424 B2 | 8/2020 | Son et al. |
| 10,735,205 B1 | 8/2020 | Wentz et al. |
| 10,796,178 B2 | 10/2020 | Fan et al. |
| 10,810,423 B2 | 10/2020 | Thavalengal |
| 11,080,516 B1 | 8/2021 | Joshi et al. |
| 11,080,517 B2 | 8/2021 | Wu et al. |
| 11,093,771 B1 | 8/2021 | Genner |
| 11,095,631 B1 | 8/2021 | Genner |
| 11,151,468 B1 | 10/2021 | Chen et al. |
| 11,681,787 B1 * | 6/2023 | Genner .................. G06F 21/602 726/7 |
| 2004/0019570 A1 | 1/2004 | Bolle et al. |
| 2004/0096085 A1 | 5/2004 | Matsumoto et al. |
| 2004/0186906 A1 | 9/2004 | Torrant et al. |
| 2005/0235148 A1 | 10/2005 | Scheidt et al. |
| 2006/0015358 A1 | 1/2006 | Chua |
| 2006/0042483 A1 | 3/2006 | Work et al. |
| 2006/0114520 A1 | 6/2006 | Enomoto et al. |
| 2006/0212931 A1 | 9/2006 | Shull et al. |
| 2007/0174633 A1 | 7/2007 | Draper et al. |
| 2008/0005578 A1 * | 1/2008 | Shafir ...................... G07C 9/37 713/186 |
| 2008/0310727 A1 | 12/2008 | Wu et al. |
| 2008/0313714 A1 | 12/2008 | Fetterman et al. |
| 2009/0022374 A1 | 1/2009 | Boult |
| 2009/0080717 A1 | 3/2009 | Dias |
| 2009/0210722 A1 | 8/2009 | Russo |
| 2009/0271634 A1 | 10/2009 | Boult et al. |
| 2009/0310830 A1 | 12/2009 | Bolle et al. |
| 2009/0327054 A1 | 12/2009 | Yao et al. |
| 2010/0017618 A1 | 1/2010 | Golic et al. |
| 2010/0174914 A1 * | 7/2010 | Shafir ...................... G07C 9/37 713/186 |
| 2010/0194919 A1 | 8/2010 | Ishii et al. |
| 2010/0250676 A1 | 9/2010 | Ufford et al. |
| 2011/0099277 A1 | 4/2011 | Yao et al. |
| 2011/0131643 A1 | 6/2011 | Lawrence et al. |
| 2011/0137789 A1 | 6/2011 | Kortina et al. |
| 2011/0246766 A1 | 10/2011 | Orsini et al. |
| 2011/0285748 A1 | 11/2011 | Slatter et al. |
| 2012/0011066 A1 | 1/2012 | Telle et al. |
| 2012/0014507 A1 | 1/2012 | Wu et al. |
| 2012/0072384 A1 | 3/2012 | Schreiner et al. |
| 2012/0102332 A1 | 4/2012 | Mullin |
| 2012/0124651 A1 | 5/2012 | Ganesan et al. |
| 2012/0130863 A1 | 5/2012 | Tedjamulia et al. |
| 2012/0284786 A1 | 11/2012 | Somani et al. |
| 2012/0331567 A1 | 12/2012 | Shelton |
| 2013/0004033 A1 | 1/2013 | Trugenberger |
| 2013/0086641 A1 | 4/2013 | Mehr et al. |
| 2013/0104202 A1 | 4/2013 | Yin et al. |
| 2013/0124644 A1 | 5/2013 | Hunt et al. |
| 2013/0191898 A1 | 7/2013 | Kraft |
| 2013/0219479 A1 | 8/2013 | DeSoto et al. |
| 2013/0259228 A1 | 10/2013 | Ren et al. |
| 2013/0262873 A1 | 10/2013 | Read et al. |
| 2014/0013422 A1 | 1/2014 | Janus et al. |
| 2014/0020073 A1 | 1/2014 | Ronda et al. |
| 2014/0037074 A1 | 2/2014 | Bravo et al. |
| 2014/0037156 A1 | 2/2014 | Cavallini |
| 2014/0059660 A1 | 2/2014 | Marra et al. |
| 2014/0071131 A1 | 3/2014 | Kitago |
| 2014/0075513 A1 | 3/2014 | Trammel et al. |
| 2014/0090039 A1 | 3/2014 | Bhow |
| 2014/0101434 A1 | 4/2014 | Senthurpandi et al. |
| 2014/0129493 A1 | 5/2014 | Leopold |
| 2014/0164218 A1 | 6/2014 | Stewart |
| 2014/0230023 A1 | 8/2014 | Parks |
| 2014/0247985 A1 | 9/2014 | Park |
| 2014/0253707 A1 | 9/2014 | Gangadhar |
| 2014/0258305 A1 | 9/2014 | Kapadia et al. |
| 2014/0270404 A1 | 9/2014 | Hanna et al. |
| 2014/0273978 A1 | 9/2014 | Van Snellenberg |
| 2014/0279556 A1 | 9/2014 | Priebatsch et al. |
| 2014/0289833 A1 | 9/2014 | Briceno et al. |
| 2014/0330732 A1 | 11/2014 | Grignon |
| 2014/0333415 A1 | 11/2014 | Kursun |
| 2014/0337948 A1 | 11/2014 | Hoyos |
| 2015/0046327 A1 | 2/2015 | Taupitz |
| 2015/0059003 A1 | 2/2015 | Bouse |
| 2015/0078630 A1 | 3/2015 | Derakhshani et al. |
| 2015/0121456 A1 | 4/2015 | Milman et al. |
| 2015/0154436 A1 | 6/2015 | Shi et al. |
| 2015/0156031 A1 | 6/2015 | Fadell et al. |
| 2015/0180857 A1 | 6/2015 | Schulman et al. |
| 2015/0186721 A1 | 7/2015 | Derakhshani et al. |
| 2015/0205800 A1 | 7/2015 | Work et al. |
| 2015/0227890 A1 | 8/2015 | Bednarek et al. |
| 2015/0261999 A1 | 9/2015 | Thiebot et al. |
| 2015/0269394 A1 | 9/2015 | Bringer et al. |
| 2015/0332169 A1 | 11/2015 | Bivens et al. |
| 2016/0019614 A1 | 1/2016 | Dziuk |
| 2016/0034708 A1 | 2/2016 | Shim et al. |
| 2016/0037156 A1 | 2/2016 | Lee |
| 2016/0048837 A1 | 2/2016 | Jin et al. |
| 2016/0050199 A1 | 2/2016 | Ganesan |
| 2016/0070704 A1 | 3/2016 | Yu |
| 2016/0085958 A1 | 3/2016 | Kang |
| 2016/0088023 A1 | 3/2016 | Handa et al. |
| 2016/0132901 A1 | 5/2016 | Davar et al. |
| 2016/0173605 A1 | 6/2016 | Iasi et al. |
| 2016/0191513 A1 | 6/2016 | Tomlinson et al. |
| 2016/0224853 A1 | 8/2016 | Xiong |
| 2016/0269178 A1 | 9/2016 | Yang et al. |
| 2016/0277424 A1 | 9/2016 | Mawji et al. |
| 2016/0379182 A1 | 12/2016 | Sheng et al. |
| 2017/0006008 A1 | 1/2017 | Moran et al. |
| 2017/0019400 A1 | 1/2017 | Drolshagen et al. |
| 2017/0032485 A1 | 2/2017 | Vemury |
| 2017/0034183 A1 | 2/2017 | Enqvist et al. |
| 2017/0061138 A1 | 3/2017 | Lambert |
| 2017/0082740 A1 | 3/2017 | Kitchens, II et al. |
| 2017/0134366 A1 | 5/2017 | Genner et al. |
| 2017/0140204 A1 | 5/2017 | Derakhshani et al. |
| 2017/0210525 A1 | 7/2017 | Mayer et al. |
| 2017/0250796 A1 | 8/2017 | Samid |
| 2017/0256056 A1 | 9/2017 | Jain et al. |
| 2017/0264599 A1 | 9/2017 | O'Regan et al. |

(56) References Cited

U.S. PATENT DOCUMENTS

| | | |
|---|---|---|
| 2017/0279795 A1 | 9/2017 | Redberg |
| 2017/0286788 A1 | 10/2017 | Fan et al. |
| 2017/0331818 A1 | 11/2017 | Kader et al. |
| 2017/0346851 A1 | 11/2017 | Drake |
| 2017/0372055 A1 | 12/2017 | Robinson et al. |
| 2018/0005019 A1 | 1/2018 | Chattopadhyay et al. |
| 2018/0018651 A1 | 1/2018 | Nelson et al. |
| 2018/0034852 A1 | 2/2018 | Goldenberg |
| 2018/0048472 A1 | 2/2018 | Pirrwitz et al. |
| 2018/0060648 A1 | 3/2018 | Yoo et al. |
| 2018/0069703 A1 | 3/2018 | Chakraborty et al. |
| 2018/0077571 A1 | 3/2018 | Mannopantar et al. |
| 2018/0082455 A1 | 3/2018 | Yamaji et al. |
| 2018/0097806 A1 | 4/2018 | Blinn |
| 2018/0101742 A1 | 4/2018 | Burge et al. |
| 2018/0167388 A1 | 6/2018 | Farrell et al. |
| 2018/0191501 A1 | 7/2018 | Lindemann |
| 2018/0205557 A1 | 7/2018 | Sun |
| 2018/0211092 A9 | 7/2018 | Derakhshani et al. |
| 2018/0248699 A1 | 8/2018 | Andrade |
| 2018/0302406 A1 | 10/2018 | Burckhardt et al. |
| 2018/0307895 A1 | 10/2018 | Chu et al. |
| 2019/0043148 A1 | 2/2019 | Vemury |
| 2019/0311102 A1 | 10/2019 | Tussy |
| 2019/0312734 A1 | 10/2019 | Wentz et al. |
| 2019/0334884 A1 | 10/2019 | Ross et al. |
| 2019/0379541 A1 | 12/2019 | Schwach et al. |
| 2020/0036707 A1 | 1/2020 | Callahan et al. |
| 2020/0084191 A1 | 3/2020 | Nicholls |
| 2020/0145219 A1 | 5/2020 | Sebastian et al. |
| 2020/0153624 A1 | 5/2020 | Wentz et al. |
| 2020/0186350 A1 | 6/2020 | Wentz et al. |
| 2020/0201679 A1 | 6/2020 | Wentz |
| 2020/0257889 A1 | 8/2020 | Merkel et al. |
| 2020/0293640 A1 | 9/2020 | Joshi et al. |
| 2020/0351089 A1 | 11/2020 | Wentz |
| 2020/0351098 A1 | 11/2020 | Wentz |
| 2020/0351657 A1 | 11/2020 | Wentz |
| 2020/0356085 A1 | 11/2020 | Wentz et al. |
| 2020/0404019 A1 | 12/2020 | Drake |
| 2021/0004373 A1* | 1/2021 | Sankaran .......... G06F 16/24534 |
| 2021/0019519 A1 | 1/2021 | Martin et al. |
| 2021/0027080 A1 | 1/2021 | Storm et al. |
| 2021/0073518 A1 | 3/2021 | Kumar et al. |
| 2023/0351115 A1* | 11/2023 | Zeng .................. G06V 30/413 |

FOREIGN PATENT DOCUMENTS

| | | |
|---|---|---|
| WO | 2008010773 A1 | 1/2008 |
| WO | 2019034589 A1 | 2/2019 |

OTHER PUBLICATIONS

Xinting Gao, Single-View Recaptured Image Detection Based on Physics-Based Features, 2010 IEEE International Conference on Multimedia and Expo, Jul. 19, 2010, pp. 1469 to 1474.

Di Wen, Face Spoof Detection with Image Distortion Analysis, IEEE Transactions on Information Forensics and Security, vol. 10, No. 4, Apr. 2015, pp. 746 to 761.

Rohit Kumar Pandey, Deep Secure Encoding for Face Template Protection, Conference on Computer Vision and Pattern Recognition Workshops, Jun. 26, 2016, pp. 77 to 83.

Rathgeb et al., "Unlinkable Improved Multi-biometric Iris Fuzzy Vault", EURASIP Journal on Information Security, 2016, 2016:26.

* cited by examiner

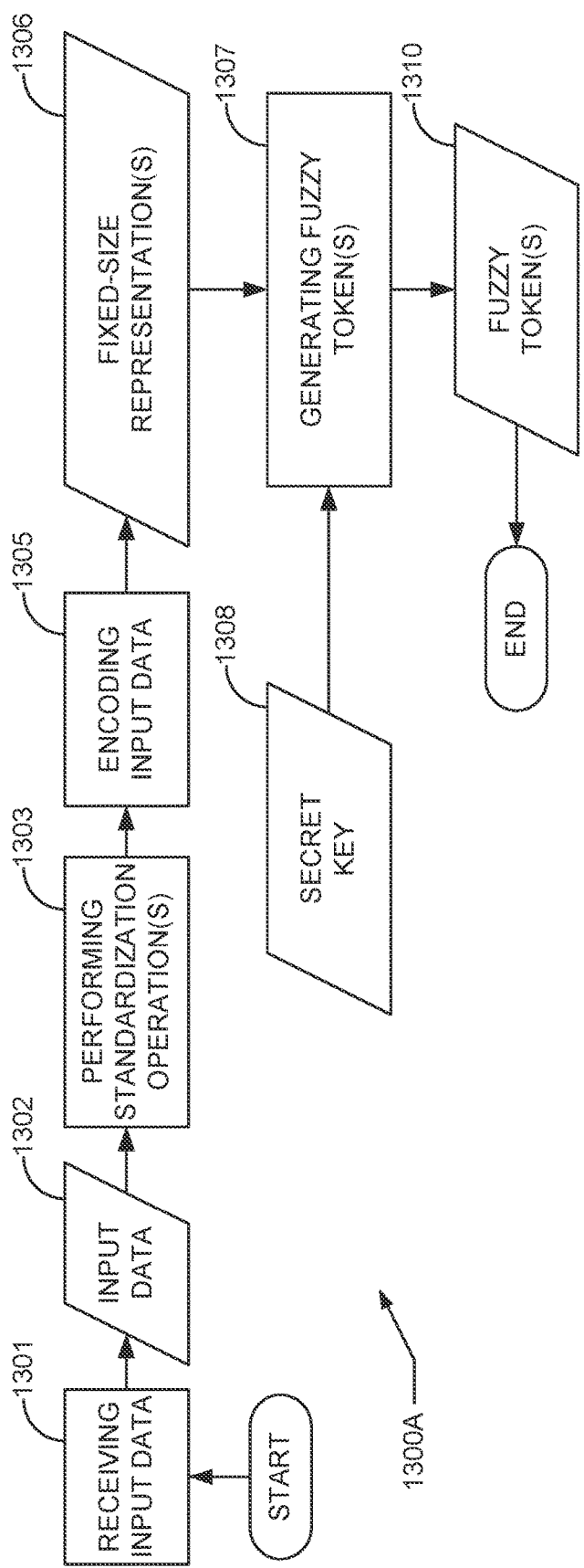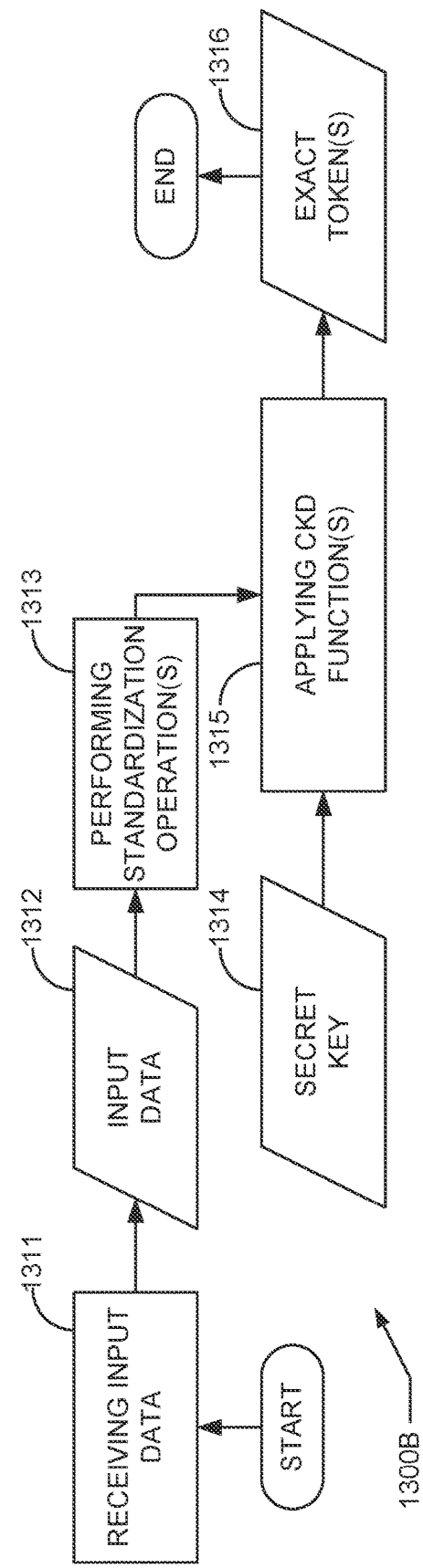
FIG. 13A
FIG. 13B

PERSONAL IDENTIFIABLE INFORMATION ENCODER

CROSS REFERENCE TO RELATED APPLICATION

This application claims benefit of and priority to U.S. Application No. 63/174,405, filed Apr. 13, 2021, entitled "PERSONAL IDENTIFIABLE INFORMATION ENCODER," the disclosure of which is incorporated herein by reference in its entirety.

TECHNICAL FIELD

The present systems and processes relate generally to generating anonymized representations of data, such as personal identifiable information (PII).

BACKGROUND

Previous approaches to storing personal identifiable information (PII) typically rely on lossless transformation and/or encryption techniques for translating raw PII data into a secondary representation that obfuscates the PII. However, such approaches may provide insufficient security, for example, due to the potential reversibility or decryption of the secondary representation. As one example, assume an attacker obtains secondary representations of social security numbers and legal names that were generated according to lossless transformation techniques of previous approaches. In this example, because the secondary template contains all information from the original template (albeit in different format), the attacker may be able to reverse the transformation in order to access the social security numbers and legal names in their original, non-obfuscated format.

In addition, lossy approaches to PII transformation may be infeasible in previous approaches, because the lossy transformation-produced representations can contribute to an intolerable loss of matching accuracy. For example, in either transformation technique, input data (e.g., a text string) must be translated into a fixed size vector first. Transformation from variable to fixed size is an extremely challenging problem because the process of translation from a variable-length representation to a fixed-size representation invariably results in a significant drop in accuracy, and such drops in accuracy are exacerbated in lossy transformation techniques.

Therefore, there is a long-felt but unresolved need for a system or process that can transform size-variant, personal identifiable information into fixed-size, privacy-secured representations, while maintaining accurate biometric matching capabilities.

BRIEF SUMMARY OF THE DISCLOSURE

Briefly described, and according to one embodiment, aspects of the present disclosure generally relate to systems and processes for transforming data, such as personal identifiable information, into a secure, anonymized representation.

In various embodiments, the present disclosure provides a system and process for translating personal identifiable information (PII) into a fixed-size vector format that is suitable for transformation to a token representation. In one or more embodiments, the process includes encoding an input into two or more discrete representations, such as a bi-grams, generating a fixed-size representation of the input based on the two or more discrete representations, and applying a smoothing function to the fixed-size representation. According to one embodiment, the process includes normalizing the fixed-size representation into a unit normalized vector and applying a lossy transformation function to the unit normalized vector to generate an irreversibly transformed token.

In at least one embodiment, the present solution advantageously improves matching performance by appending classifying data to an input to be represented for the purposes of reducing equal error rate in matching. For example, the system may append a state code value to driver's license numbers such that encoded representations of the driver's license numbers may be matched with improved accuracy and/or speed. In one or more embodiments, the system leverages data-independent encoding techniques such that the solution is agnostic as to a culture or ethnicity with which input data may be associated. For example, an encoding system of the present disclosure may encode a string input into two or more two-character bi-grams that provide a data-dense and compact representation of the string input regardless of a particular culture, ethnicity, or other demographic factor with which the string input is associated.

In various embodiments, the system generates fixed-size representations of variable length inputs by mapping bi-gram representations onto a co-occurrence matrix that represents a distribution of bi-gram values. According to one embodiment, to preserve continuity in the co-occurrence matrix, the system applies Gaussian kernels of varying width to the co-occurrence matrix and performs a linear kernel combination of the Gaussian-transformed co-occurrence matrices to generate a smoothed co-occurrence matrix. In at least one embodiment, the system generates a privacy-secured, irreversible token representative of the input data by normalizing the smoothed co-occurrence matrix and applying a lossy transformation function.

According to one embodiment, the tokens described herein provide a plurality of advantages including, but not limited to, irreversibility (e.g., it is computationally hard to reverse the lossy transformation), revocability (e.g., if compromised or stolen, a token can be revoked or cancelled), un-linkability (e.g., two tokens of the same person appear differently when they are transformed using two different sets of parameters, such as separate salt values), and matchability. Matchability generally refers to a property of the solution in which two representations of the same input data can still be matched despite misspelling, for example, due to character swapping or error introduced by an OCR system, or natural variations in how a name appears. For example, token representations of the semantically equivalent inputs "Muhammad," "Mohammad," and "Mohd" may be sufficiently similar such that a matching process may positively match a token representation of "Muhammad" to token representations of the semantically equivalent "Mohd" and "Mohammad."

According to a first aspect, an encoding process, comprising: A) obtaining personal identifiable information (PII) data corresponding to an individual and comprising a string format; B) segregating the PII data into two or more secondary representations; C) generating a plurality of co-occurrence matrices based on the two or more secondary representations; D) filtering each of the plurality of co-occurrence matrices by a different filter of a plurality of filters; E) generating a tertiary representation of the PII data by applying a combination function to the plurality of co-occurrence matrices; and F) performing a lossy tokenization process to generate at least one token based on the tertiary representation of the PII data.

According to a further aspect, the process of the first aspect or any other aspect, further comprising: A) generating scannable media comprising the at least one token; and B) transmitting the scannable media to a computing device.

According to a further aspect, the process of the first aspect or any other aspect, wherein the plurality of filters comprise a plurality of Gaussian kernels of varying width.

According to a further aspect, the process of the first aspect or any other aspect, wherein each of the two or more secondary representations is an n-gram representation.

According to a further aspect, the process of the first aspect or any other aspect, wherein the n-gram representation is a bi-gram representation.

According to a further aspect, the process of the first aspect or any other aspect, further comprising, prior to segregating the PII data: A) applying at least one policy to the PII data to generate classification data; and B) appending the classification data to the PII data.

According to a further aspect, the process of the first aspect or any other aspect, wherein the classification data comprises at least one of a location code, a timestamp, or an issuing authority identifier.

According to a further aspect, the process of the first aspect or any other aspect, further comprising extracting the PII data from input data via at least one of optical character recognition (OCR) and natural language processing (NLP).

According to a further aspect, the process of the first aspect or any other aspect, wherein the input data comprises one of: a driver's license, a passport document, or a social security card.

According to a second aspect, an encoding system, comprising: A) at least one processor in communication with at least one data store; B) the at least one data store; and C) a non-transitory, machine-readable memory device comprising instructions stored thereon that, when executed by the at least one processor, cause the at least one processor to: 1) obtain personal identifiable information (PII) data; 2) segregate the PII data into two or more secondary representations; 3) generate a plurality of co-occurrence matrices based on the two or more secondary representations; 4) perform a convolution between each of the plurality of co-occurrence matrices and one of a plurality of Gaussian kernels, wherein each of the plurality of Gaussian kernels comprises a different width; 5) generate the tertiary representation of the PII data by performing a linear combination of the plurality of co-occurrence matrices; 6) generate at least one vector based on the tertiary representation of the PII data; 7) perform a lossy tokenization process on the at least one vector to generate at least one token; and 8) store the at least one token at the data store.

According to a further aspect, the system of the second aspect or any other aspect, wherein the instructions, when executed by the at least one processor, further cause the at least one processor to convert the PII data to a string format prior to segregating the PII data.

According to a further aspect, the system of the second aspect or any other aspect, wherein the instructions, when executed by the at least one processor, further cause the at least one processor to: A) compare the at least one token to at least one other token stored at the data store; B) based on the comparison, determine that the at least one token is within a similarity threshold of the at least one other token; and C) transmit, to a computing device, a positive verification of a subject associated with the at least one other token.

According to a further aspect, the system of the second aspect or any other aspect, wherein the instructions, when executed by the at least one processor, further cause the at least one processor to, prior to generating the tertiary representation of the PII data, apply one of a plurality of weight values to each of the plurality of co-occurrence matrices.

According to a further aspect, the system of the second aspect or any other aspect, wherein: A) individual values of the plurality of weight values are each associated with one of a plurality of categories; and B) the instructions, when executed by the at least one processor, further cause the at least one processor to: 1) classify each of the plurality of co-occurrence matrices into one of the plurality of categories; and 2) apply the one of the plurality of weight values to each of the plurality of co-occurrence matrices by applying the individual value of the plurality of weight values corresponding to the one of the plurality of categories into which the co-occurrence matrix was classified.

According to a further aspect, the system of the second aspect or any other aspect, wherein: A) the plurality of categories comprises a first name category, a last name category, and a middle name category; and B) individual values of the plurality of weight values that are associated with first name category or the last name category are greater than individual values of the plurality of weight values associated with the middle name category.

According to a further aspect, the system of the second aspect or any other aspect, wherein the plurality of weight values are equal.

According to a further aspect, the system of the second aspect or any other aspect, wherein, prior to performing the convolution, the plurality of co-occurrence matrices are identical.

According to a third aspect, a non-transitory, computer-readable medium comprising instructions that, when executed by a computer, cause the computer to: A) obtain input data comprising text personal identifiable information (PII) data and numerical PII data; B) encode the text PII data into at least one fixed-size representation (FXR); C) apply at least one standardization operation to the numerical PII data to generate standardized numerical PII data; D) generate a first key by applying a key derivation function to the standardized numerical PII data; E) concatenate the at least one FXR and the first key to generate a concatenated FXR; F) obtain a second key; and G) perform a lossy tokenization process to generate a token based on the concatenated FXR and the second key.

According to a further aspect, the non-transitory, computer-readable medium of the third aspect or any other aspect, wherein the instructions, when executed by the computer, cause the computer to: A) generate scannable media based on the token; and B) transmit the scannable media to a computing device.

According to a further aspect, the non-transitory, computer-readable medium of the third aspect or any other aspect, wherein the instructions, when executed by the computer, cause the computer to encode the text PII data into the at least one FXR by: A) segregating the text PII data into two or more secondary representations; B) generating a plurality of co-occurrence matrices based on the two or more secondary representations; C) applying, to each of the plurality of co-occurrence matrices, a different one of a plurality of Gaussian kernels, wherein each of the plurality of Gaussian kernels comprises a different width; and D) generating the at least one FXR by applying a combination function and a normalization operation to the plurality of co-occurrence matrices.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein:

FIGS. 13A-B show exemplary encoding workflows, according to one embodiment of the present disclosure;

DETAILED DESCRIPTION

Figure 1:
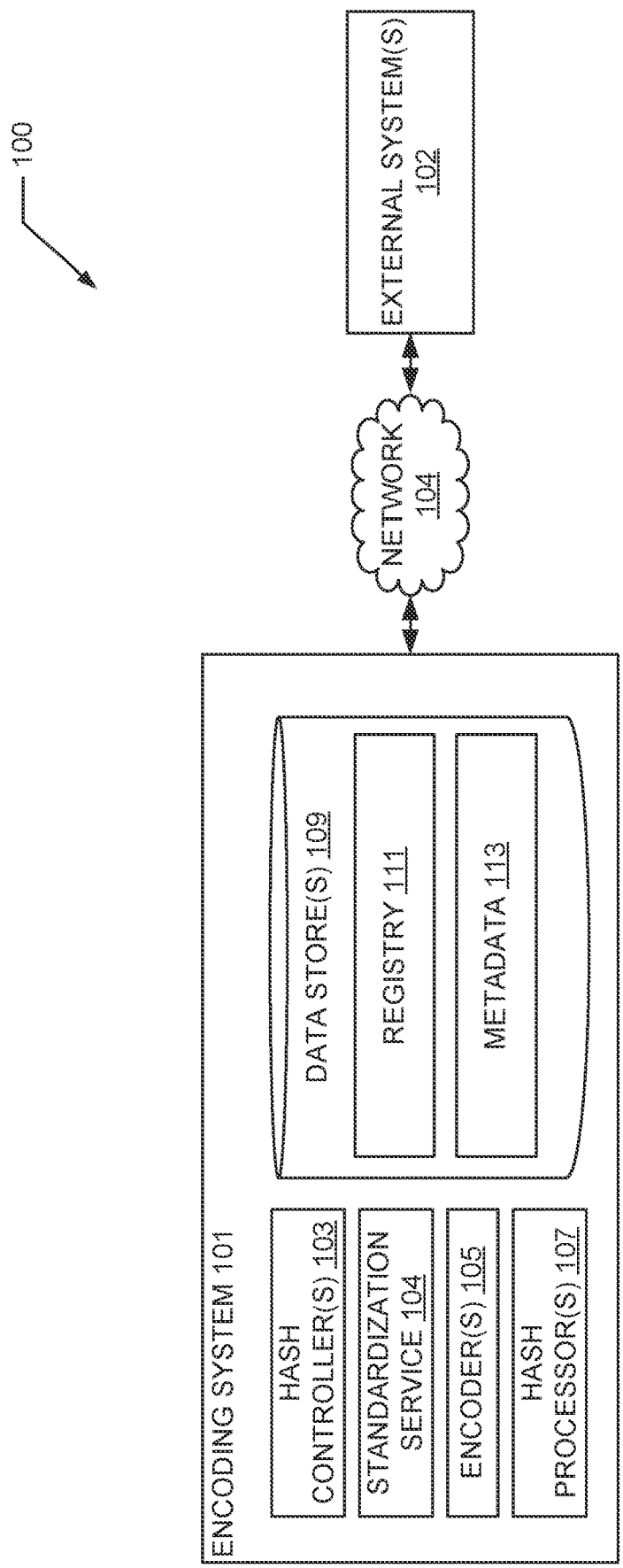
FIG. 1 shows an exemplary encoding system, according to one embodiment of the present disclosure.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

As used herein, fixed-size representation generally refers to a fuzzy numerical representation of input data, such as a name string. For example, the present system may translate a string "Muhamad Ali" into a fixed-size representation [0.1, 0.5, 0.2, 0.5]. In various embodiments, the system can each element of a fixed-size representation as an 8-bit signed integer (e.g., to minimize storage space). For example, the system can convert a first fixed-size representation [0.1, 0.5, 0.2, 0.5] into a second fixed-size representation [94, −25, 8, 15]. According to one embodiment, an 8-bit signed integer format is advantageously compact and discretized as compared to unsigned or non-fixed-size representations. In at least one embodiment, fixed-size representation can be advantageous for compact storage of PII, such as, for example, in a smartcard or other computing device with limited storage capacity. In one or more embodiments, fixed sized representation enables retrieval and comparison processes to be performed more rapidly and efficiently on small computer platforms, such as a smartphone or a Raspberry Pi, as compared to retrieval and comparison processes performed with non-fixed size representations.

Overview

Aspects of the present disclosure generally relate to generating pseudo-anonymized representations of data.

In various embodiments, the present disclosure provides systems and processes for transforming a data object of personal identifiable information (e.g., names, email addresses, telephone numbers) into a secure representation that cannot be reversed to access, view, or utilize the original information being represented. According to one embodiment, the present encoding solution includes encoding input data (e.g., personally identifiable data) into a fixed-size representation and transforming the fixed-size representation into an irreversible representation, also referred to as a token. In at least one embodiment, encoded representations and tokens generated by the present systems and processes can be compared and matched at speed and scale for various purposes, such as, for example, subject identification and identity verification.

Exemplary Embodiments

Referring now to the figures, for the purposes of example and explanation of the fundamental processes and components of the disclosed systems and processes, reference is made to FIG. 1, which illustrates an exemplary network environment 100 in which an encoding system 101 may operate, according to one embodiment. As will be understood and appreciated, the exemplary network environment 100 and exemplary encoding system 101 shown in FIG. 1 represent merely one approach or embodiment of the present system, and other aspects are used according to various embodiments of the present system.

In various embodiments, the encoding system 101 encodes input data (e.g., personal identifiable information (PII) data) into a pseudo-anonymized representation and transforms the pseudo-anonymized representation into an irreversible, privacy-secured token. In some embodiments, the encoding system 101 combines two or more PII data elements (e.g., of same or varying attributes or category) to generate an exact or fuzzy token that is representative thereof each. For example, the encoding system 101 can combine a first name string, a last name string, and a date of birth string into a single secure token. According to one embodiment, the ability to generate combined and/or hybrid tokens is advantageous to token security because the entropy is increased in an additive manner, thereby increasing the complexity and difficulty of recovering the original raw input PII text data from a compromised (e.g., stolen) token.

In at least one embodiment, the network environment 100 includes an encoding system 101 in communication with one or more external systems 102 over one or more network 104. In various embodiments, the encoding system 101 includes one or more computing environments. The elements of the encoding system 101 can be provided via a plurality of computing devices that may be arranged, for example, in one or more server banks or computer banks or other arrangements. Such computing devices can be located in a single installation or may be distributed among many different geographical locations. For example, the encoding system 101 can include a plurality of computing devices that together may include a hosted computing resource, a grid computing resource, and/or any other distributed computing arrangement. In some embodiments, the encoding system 101 can correspond to an elastic computing resource where the allotted capacity of processing, network, storage, or other computing-related resources may vary over time. In one or more embodiments, the encoding system 101 corresponds to a software application or in-browser program that may be accessed via a computing device, such as, for example, a mobile phone, tablet, security terminal, or voice command device (e.g., smart speakers, entertainment systems, etc.).

According to one embodiment, the external system 102 generally refers to systems or computing devices that process, store, and/or perform actions based at least in part on personal identifiable information (PII) or other information that is to be secured against illicit access, use, or observation. In various embodiments, the external system 102 receives data, such as PII, that are to be identified or validated based on a comparison between the received data and stored data (e.g., previously received PII). In one example, the external system 102 may include a driver registration system for storing and verifying driver's license information from employees of a ride sharing company. In another example, the external system 102 may include a password storage software application running on a mobile computing device. In another example, the external system 102 may include a healthcare informatics system for providing approved parties access to patient data. In still another example, the external system 102 may include one or more digital platforms for facilitating virtual or augmented user experiences (e.g., virtual reality systems, augmented reality systems, metaverses, etc.). As will be understood and appreciated, the external system can take many forms and the systems and processes described herein can be used for a wide variety of end use applications.

The network 104 includes, for example, the Internet, intranets, extranets, wide area networks (WANs), local area networks (LANs), wired networks, wireless networks, or other suitable networks, etc., or any combination of two or more such networks. For example, such networks can include satellite networks, cable networks, Ethernet networks, and other types of networks. In at least one embodiment, the encoding system 101 accesses one or more application programming interfaces (API) to facilitate communication and interaction between the encoding system 101 and one or more external systems 102.

In one or more embodiments, the encoding system 101 includes one or more hash controllers 103, one or more standardization services 104, one or more encoders 105, one or more hash processors 107, and one or more data stores 109. In one or more embodiments, the hash controller 103 controls input encoding and transformation processes. In various embodiments, the hash controller 103 receives inputs from the external system 102, such as, for example, PII data, user selections, access credentials (e.g., usernames, passwords, device identifiers, network identifiers, etc.). In one example, in response to receiving a string-formatted driver's license number from an external system 102, the hash controller 103 may initiate an encoding process (such as the process 200 shown in FIG. 2) to encode the driver's license number into a fixed-size representation and transform the fixed-size representation into an irreversibly transformed, privacy-secured token. In some embodiments, the hash controller 103 (e.g., or another system or module in communication therewith) receives data from the external system 102 via one or more inline frames (iframes). In at least one embodiment, the hash controller 103 causes a browser of the external system 102 to render the iframe on a user interface such that PII data entered into the user interface is collected directly into the encoding system 101 (e.g., thereby avoiding the collection or movement of sensitive information into the external system 102).

In one or more embodiments, the standardization service 104 performs standardization operations on PII data obtained by the encoding system 102. Non-limiting examples of standardization operations include converting character strings to a single case, removing spaces from or between character strings, removing one or more characters from character strings (e.g., apostrophes, quotation marks, plus symbols, etc.), and converting a character string, or set of strings, from a first format to a second format. Table 1 provides non-limiting examples of PII data before and after processing via the standardization service 104. In some embodiments, the standardization service 104 communicates with one or more external systems 102 to perform NLP and/or OCR operations.

TABLE 1

Exemplary Standardizations of PII Data

| Operation | Before | After |
|---|---|---|
| Standardizing Name | John Smith | john smith |
| | Johnny O'Sullivan | johnny osullivan |
| | Francois-Xavier Dupont | francois-xavier dupont |
| Standardizing Phone number | +441234567890 | 441234567890 |
| | +(44)-1234567890 | 441234567890 |
| Standardizing Date | 25 Dec. 2022 | yyyymmdd: 20221225 |

The standardization service 104 can perform standardization operations by applying one or more rules or policies to PII data. The rules and policies can be stored in the data store 109 as metadata 113 and retrieved therefrom. The standardization service 104 can perform standardization operations based on a category or other attribute with which PII data is associated. The standardization service 104 can determine a category or other attribute with which PII data is associated by applying rules, policies, or heuristics to the PII data, by retrieving indications of such information from metadata 113 associated with the PII data, by applying one or more classification techniques, models or algorithms, or via combinations thereof. In some embodiments, the encoding system 101 receives PII data and indications of one or more categories with which the PII data is associated. For example, the hash controller 103 can receive PII data of "Troy Ferguson" and an indication that "Troy" is associated with a first name category and "Ferguson" is associated with a last name category. In this example, the standardization service 104 can apply a text string policy to the PII data to determine that the PII data excludes numerical characters. Non-limiting examples of classification techniques, models, and algorithms include uni- and multi-layer perceptrons and other neural networks, random forest classification models, local topic modeling, and vectorization of PII input followed by comparison to one or more pre-defined category clusters.

The standardization service 104 can perform natural language processing (NLP) and/or optical character recognition (OCR) to extract PII data from input data and/or further process PII data into a format suitable for further processing. In one example, the hash controller 103 may receive input data including a scan of a driver's license. Continuing the example, the standardization service 104 can perform OCR on the scan to identify and extract text strings for a legal name, date of birth, date of issuance, date of expiration, and driver's license number. In the same example, the standardization service 104 can generate metadata 113 for each extracted text string corresponding to the category of information with which the text string is associated. In another example, the hash controller 103 may receive an audio file including an utterance of a user's name and employee identification number. Continuing the example, the standardization service 104 can perform an NLP operation to process the audio file, detect the utterances of PII, and generate PII data text strings (e.g., for subsequent tokenization).

In another example, the hash controller 103 can receive an audio recording of a subject's utterance of their name and date of birth. Continuing the example, via NLP processing, the standardization service 104 can generate a string-formatted text transcription of the audio recording (e.g., the transcription used as a string input to encoding processes described herein). In at least one embodiment, the standardization service 104 performs further processing of NLP transcriptions to remove non-PII words and expressions (e.g., "and," "uhm," "uh," etc.) and/or to differentiate and segregate subsets of PII data, such as, for example, names from numerical identifiers, first names from last or middle names, and text-based locational identifiers from numerical identifiers.

In various embodiments, the encoder 105 converts input data from a received format, such as a string, to a processing format, such as a fixed-size, vector-based representation. In at least one embodiment, the encoder 105 is data independent such that encoding processes performed thereby are agnostic to cultural- and ethnic-related variations in the formatting and structure of input data. For example, the encoder 105 can encode a string-formatted legal name into a fixed-size representation regardless of whether the legal name conforms to Western conventions on ordering of titles (e.g., first name followed by last name) or a particular writing system (e.g., Latin, Cyrillic, Chinese, Japanese, Korean, and other character systems). In various embodiments, the encoder 105 applies a bi-gram character encoding algorithm to encode input data into culturally-agnostic vector representations.

In some embodiments, the encoder 105 is data dependent (e.g., encoding processes can be culturally dependent). In at least one embodiment, the encoder 105 applies N-gram, neural network, neural network-based long-short term memory (LSTM), or other suitable algorithms and architectures to encode string-formatted inputs into fixed-size representations. Non-limiting examples of neural networks include uni- or multilayer perceptron, convolutional neural networks, recurrent neural networks, long short-term memory networks, auto-encoders, deep Boltzman machines, deep belief networks, back-propagations, stochastic gradient descents, Hopfield networks, and radial basis function networks.

In one or more embodiments, the encoding system 101 trains a data dependent encoder 105 using one or more training sets that are representative of a target population for which the encoding system 101 will be implemented. For example, for a target population associated with Costa Rica (e.g., in which middle names may have excise influence for unique identification of a subject), the encoding system 101 may train the encoder 105 using a training set derived from one or more corpuses, libraries, or databases of Costa Rican PII data. As another example, for a target population associated with Thailand (e.g., in which nicknames or name abbreviations are utilized with increased frequency and importance), the encoding system 101 may train the encoder 105 using a training set derived from one or more corpuses, libraries, or databases of Thai PII data.

In various embodiments, a data-dependent encoder 105 applies dimensionality reduction algorithms to reduce a prevalence of extremely sparse representations that may be generated during the encoding process. Non-limiting examples of dimensionality reduction algorithms include principal component analysis (PCA), factor analysis (FA), linear discriminant analysis (LDA), truncated singular value decomposition (SVD), kernel PCA, t-distributed stochastic neighbor embedding (t-SNE), multidimensional scaling (MDS), isometric mapping, recursive feature elimination (RFE), forward selection, and random forests. In one or more embodiments, the encoder 105 includes one or more language models that generate vector space representations (e.g., word embeddings) from a word or phrase, such as, for example, word2vec, context2vec, GloVe, ELMo, and variations thereof.

In various embodiments, the hash processor 107 transforms outputs from the encoder 105 (e.g., fixed-size representations of string inputs) into irreversibly transformed, privacy-secured tokens (e.g., also referred to as "fuzzy" tokens) by applying one or more transformation functions. In various embodiments, the transformation functions, CKD functions, and hashing functions used by the hash processor 107 are one-way transformations, meaning that the transformation is irreversible. In one or more embodiments, tokens and keys generated by the hash processor 107 demonstrate security properties including revocability, renewability, diversity, non-linkability, and irreversibility.

In various embodiments, the hash processor 107 or the encoder 105 can apply normalization techniques, operations, or algorithms to transform encoded representations of PII data into fixed-size vector representations. Further description of exemplary normalization techniques and operations are provided in step 215 of the encoding process 200 shown in FIG. 2 and described herein.

In one or more embodiments, the hash processor 107 generates a token by concatenating a fixed-size representation (FXR) output of the encoder 105 with a cryptographic key (e.g., from a pseudorandomly seeded CKD function), or other secret data, to generate a concatenated representation. In one or more embodiments, the hash processor permutes the concatenated representation with the FXR and/or the cryptographic key to generate a permuted representation. In at least one embodiment, the hash processor 107 generates one or more transformation parameters and projects the permuted representation based on one or more transformation parameters to generate the token. In one example, the hash processor 107 may generate a pseudorandom projection matrix based on a seed value (e.g., which may be pseudorandomly based on a seeding via a received or retrieved key or other secret data). Continuing the example, the hash processor 107 can multiply an FXR output of the encoder 105 by the pseudorandom projection matrix to generate a lossy, irreversible, privacy-secured token. According to one embodiment, the tokens generated by the hash processor 107 can be revoked and replaced with new tokens. In at least one embodiment, old and the new tokens cannot be linked together (e.g., a security property referred to as "non-linkability").

In one example, the encoder 105 can encode a string-formatted driver's license number into a fixed-size representation. In the same example, the hash processor 107 can normalize the fixed-size representation and applies an irreversible, lossy transformation to transform the normalized, fixed-size representation into an irreversibly transformed, privacy-secured token.

such as a policy requiring input data characters to be converted to all lower case or a policy for appending particular information to input data. In one example, a policy may cause the encoder 105 to append a state code (e.g., IL, GA, OH, etc.) to each driver's license number received as input data, the particular state code corresponding to a state with which the driver's license is registered. In at least one embodiment, the encoder 105 or standardization model 104 classifies input data, or a subset thereof, into one or more categories, such as "driver's license," "Illinois driver's license," "Georgia driver's license," "US phone number," or other suitable categories. In one or more embodiments, the encoder 105 appends particular data to input data based on one or more categories into which the input data was classified. For example, in response to classifying input data into a "driver's license" category and a "Georgia driver's license category," the encoder 105 may append a "GA" state code to the input data.

In at least one embodiment, the data store 109 stores predetermined character sets and/or alphabets by which input data is encoded into a fixed-size representation. Table 2 provides non-limiting examples of character sets that may be used for encoding input data.

TABLE 2

Exemplary Character Sets for String Encoding

| Input Data Type | Character Set |
|---|---|
| Driver's License | a, b, c, d, e, f, g, h, i, j, k, l, m, n, o, p, q, r, s, t, u, v, w, x, y, z, - ', 0, 1, 2, 3, 4, 5, 6, 7, 8, 9, <, > |
| Legal Name (Latin) | a, b, c, d, e, f, g, h, i, j, k, l, m, n, o, p, q, r, s, t, u, v, w, x, y, z, ', <, > |
| Legal Name (Cyrillic) | б, В, Г, д, ж, з, к, л, М, Н, п, р, с, Т, ф, х, ц, ч, ш, щ, а, э, ы, у, о, я, е, ё, ю, и, ь, ъ, ', <, > |

In at least one embodiment, the hash processor 107 generates exact tokens of PII data (e.g., also referred to as "derived keys") by applying one or more hashing or cryptographic key derivation (CKD) functions to the PII data. Non-limiting examples of CKD functions include SHA256, HKDF, PBKDF2, MD5, RIPEMD-60, and BLAKE3. In one example, for a numerical PII data input, the hash processor 107 may apply a SHA256 CKD function to generate an exact token including a 32 byte-length binary string. In various embodiments, the exact token may be reversed via processing the exact token, the corresponding hash or CKD function, and, in some embodiments, an additional secret key, to recover the original PII data. According to one embodiment, exact tokenization process can increase the entropy of a date of birth PII input from an entropy of $\log_2(36,500)=15$ bits (assuming a 100-year lifespan) to at most $256+15=271$ bits of the derived key (e.g., using CKD function SHA256), thereby advantageously increasing the security and complexity of reversing the derived key to recover the original date of birth PII input.

In one or more embodiments, the data store 109 stores various types of information that is used by the encoding system 101 to execute various processes and functions discussed herein. The data store 109 can be representative of a plurality of data stores as can be appreciated. In at least one embodiment, the data store 109 stores intermediary data generated during encoding processes, such as, for example, fixed-size representations generated by encoding a string input. In various embodiments, the data store 109 stores parameters and other settings by which encoding processes are performed. Non-limiting examples of parameters and settings include weight values and input processing rules, The data store 109 can include one or more registries 111 and metadata 113. In various embodiments, the registry 111 stores outputs from the hash processor 107 (e.g., irreversible representations of PII). In one example, the registry 111 can store irreversibly transformed representations of social media handles and legal names. In this example, the registry 111 may be configured such that the irreversibly transformed representations are accessible to the external system 102 for use in user identification and verification processes. In some embodiments, the external system 102 includes the registry 111. For example, the encoding system 101 can receive input data from an external system 102, generate an irreversibly transformed, privacy-secured token representative of the input data, and transmit the token to the external system 102 for storage at the registry 111.

In one or more embodiments, metadata 113 includes information related to input data received at the encoding system 101 and/or related to an external system 102 with which input data or output data is associated. In at least one embodiment, the metadata 113 includes input identifiers that define a connection between an input, an output, and/or an external system 102. In various embodiments, the metadata 113 includes networking addresses from which input data is received and/or to which corresponding output data is transmitted. In some embodiments, the metadata 113 includes labels for categorizing input and/or output data. Non-limiting examples of labels include input classification labels (e.g., driver's license number, address, first name, last name, full name, social security number, username, etc.) and demographic labels (e.g., language, ethnicity, age, location).

Figure 2:
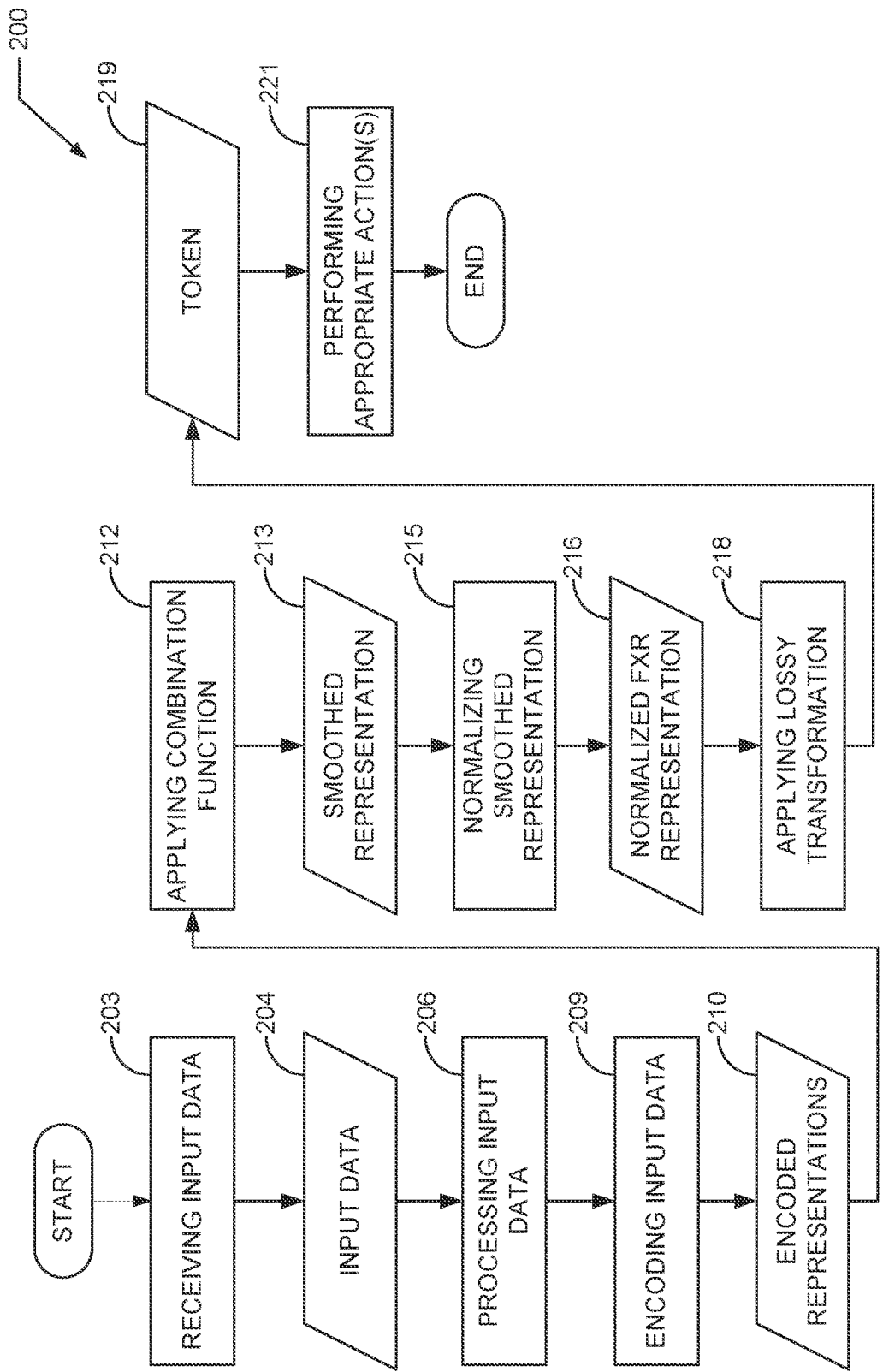
FIG. 2 is a flowchart of an encoding process, according to one embodiment of the present disclosure.

FIG. 2 shows an exemplary encoding process 200 that may be performed by an embodiment of the encoding system (e.g., such as the encoding system 101 shown in FIG. 1). As will be understood by one having ordinary skill in the art, the steps and processes shown in FIG. 2 (and those of all other flowcharts and sequence diagrams shown and described herein) may operate concurrently and continuously, are generally asynchronous and independent, and are not necessarily performed in the order shown. At step 203, the process 200 includes receiving input data 204. Non-limiting examples of input data 204 include names, identification numbers (e.g., driver's license numbers, social security numbers, etc.), locations (e.g., addresses, coordinates, etc.), email addresses, and account information (e.g., social media username, domain address, etc.). In at least one embodiment, the input data 204 includes a word, phrase, sentence, or other prose. In some embodiments, the input data 204 is formatted as a string value. In at least one embodiment, the input data 204 includes an image, such as a capture from a camera or a digital scan.

At step 206, the process 200 includes processing input data 204. In one or more embodiments, processing the input data 204 includes applying one or more policies to the input data 204. According to one embodiment, the encoding system 101 appends classifying data to a string input for the purposes of improving matching accuracy (e.g., as demonstrated in FIGS. 10-12). In one example, at step 203, the encoding system 101 may receive a driver's license number Z6158177814604 that is registered in the state of Georgia (GA). In the same example, at step 206, the encoder 105 can apply a policy by appending the state code "GA" to the beginning of the driver's license number (e.g., GAZ6158177814604).

In at least one embodiment, processing includes converting input data 204 to a string format. In some embodiments, processing the input data 204 includes extracting and storing metadata, such as, for example, a networking address from which the input data 204 is received, an identifier with which an external system 102 is associated, or a timestamp corresponding to a time at which the input data 204 was generated or received. In one or more embodiments, processing includes analyzing an image, identifying text within the image based on the analysis, and extracting the identified text into a string-formatted representation. In one example, the encoding system 101 can perform an optical character recognition (OCR) or machine learning process to automatically identify and extract text from input data 204.

In at least one embodiment, processing input data 204 includes determining spaces and/or other boundaries between discrete sub-sections of the input data 204. In one example, the encoder 105 may detect a space between a first name and last name of a legal name. In one or more embodiments, the encoder 105 applies a recognition algorithm or machine learning process to identify a structure and/or type of the input data 204. For example, the encoder 105 can determine that a string input corresponds to a "name" data type and that a first, second, and third sequence of discrete characters correspond to a first, middle, and last name. In some embodiments, the encoding system 101 stores the input data type and/or other properties of the input data 204 as metadata 113.

In one or more embodiments, processing input data 204 includes performing one or more standardization operations on the input data 204 via the standardization service 104. In at least one embodiment, the standardization service 104 converts all characters of the input data 204 to a particular case (e.g., upper case or lowercase). In one or more embodiments, the standardization service 104 converts input data 204 from a first string format to a second string format. For example, the standardization service may convert a date "Aug. 11, 2022" to "08122022." In another example, the standardization service 104 may convert a phone number "+2 555.123.456" to "2555123456."

At step 209, the process 200 includes encoding input data 204 into an encoded representation 210. In at least one embodiment, the encoded representation 210 includes a co-occurrence matrix based on values segregated from the input data 204. According to one embodiment, the encoded representation 210 is a fixed-size representation of the input data 204. For example, the encoded representation 210 may be a fixed 28×28 dimension vector representation of the input data 204.

In one or more embodiments, encoding the input data 204 includes segregating the input data 204 into a secondary representations, such as a two-character representation referred to as a "bi-gram." According to one embodiment, the encoder 105 performs bi-gram encoding of the input data 204 string input into two-character bi-grams to generate secondary representations that are culturally agnostic, data dense, and convertible to a fixed-size representation. In various embodiments, the encoder 105 applies a bi-gram policy, algorithm, or other technique to generate the bi-grams. In one example, input data 204 can include a first name "<moe>." In this example, the encoder 105 may segregate the input data 204 into bi-grams "<m," "mo," "oe," and "e>." In another example, the encoder 105 can segregate a driver's license number "<GAZ6158177814604>" a set of bi-grams {<G, GA, AZ, Z6, 61, 15, 58, 81, 17, 77, 78, 81, 14, 46, 60, 04, 4>}. According to one embodiment, bi-gram-based representation of input data 204 is advantageously agnostic as to an ethnicity, culture, or character set with which the input data 204 may be associated. For example, whereas alternative approaches may require training on a representative set of target data, the present system may be implemented without requiring adaptation or calibration of bi-gram encoding to adjust for a cultural context with which targeted input data 204 is associated. In one or more embodiments, bi-gram-based representation of input data 204 provides a compact representation of the input data 204 while preserving sufficient data density to enable accurate matching processes.

According to one embodiment, generating the encoded representation 210 includes generating a co-occurrence matrix based on two or more bi-gram representations of input data 204. As used herein, a co-occurrence matrix generally refers to a matrix that is defined over two or more bi-grams to be the distribution of bi-gram values. As one example, the encoder 105 generates bi-grams "<m," "mo," "oe," and "e>" based on an input string "Moe." Continuing the example, the encoder 105 can map the distribution bi-gram values onto a co-occurrence matrix and, thereby, generates an encoded representation 210 (see encoded representation 303A shown in FIG. 3 for further example).

In some embodiments, the encoder 105 generates an encoded representation for each segment of input data 204. In one example, input data 204 may include a full legal name "John Smith," and the encoder 105 determines that "John" corresponds to a first name and "Smith" corresponds to a last name. Continuing the example, the encoder 105 may generate bi-gram sets {J, JO, OH, HN, N>}, {<S, SM, MI, IT, TH, H>} based thereon. In the same example, the encoder 105 may map each bi-gram set to a separate co-occurrence matrix and, thereby, generates an encoded representation 210 of each segment of the input data 204 (see encoded representations 501A-B shown in FIG. 5 for further example). According to one embodiment, co-occurrence matrices allow for unique representation of inputs regardless of input length. For example, co-occurrence matrices based on two short-length names "John" and "Moe" can be identifiably dissimilar and thus serve as compact, accurate encoded representations of the input data. At step 212, the process 200 includes applying a combination function to the encoded representation 210 to generate a smoothed representation 213. As used herein, a "smoothed representation" generally refers to a matrix-based representation of input data that is generated by convolution of two or more encoded representations of the input data (e.g., such as co-occurrence matrices generated based on input data).

In one or more embodiments, the combination function refers to a linear kernel combination of two or more encoded representations 210. According to one embodiment, applying the combination function includes applying Gaussian kernels of varying width to the encoded representations 210 and linearly combining the encoded representations 210 to generate a smoothed representation 213.

In at least one embodiment, the combination function is applied according to Equation 1.

$$\text{Cooccurrence}_{smoothed}(x) = \Sigma_j w_j \text{Kernel}(\theta_j) * \text{Cooccurrence}(x) \quad \text{(Equation 1)}$$

In various embodiments, x represents input data 204 (e.g., a string-formatted data object) and Coocurence(x) represents an encoded representation 210 (e.g., a co-occurrence matrix) based on the input data 204. In one or more embodiments, Kernel represents a convolutional kernel applied to Coocurence(x) for a given width $\theta_j$ and as weighted by $w_j$. According to one embodiment, Coocurrence$_{smoothed}$(x) represents a weighted sum of Coocurence(x). In one or more embodiments, the encoder 105 uses a Gaussian kernel with periodic boundary conditions to preserve a norm of the encoded representation 210. According to one embodiment, the encoder 105 applies convolutional kernels of varying width (e.g., 1, 3, 5, etc.) to the encoded representation 210 and takes a weighted sum of the results to generate a smoothed representation 213. In various embodiments, the encoder 105 configures all weight values to unity such that the post-weight sum of all matrix elements is equal to the pre-weight sum of all matrix elements (e.g., such that an intensity value of an average pixel in the post-weight matrix is equal to an intensity value of an average pixel in the original matrix). In at least one embodiment, unity-configured weights are used to compensate for the sensitivity of small kernel sizes to local structures and the sensitivity of large kernel sizes to global structures in the co-occurrence matrix.

In some embodiments, the encoder 105 generates a smoothed representation 213 of a multi-term input, such as, for example, a legal name including a given name, a family name, and a plurality of middle names. According to one embodiment, the encoder 105 generates a smoothed representation 213 such that the representation preserves an ordering of terms from the input data 204 being represented. In some embodiments, the encoder 105 is agnostic as to an ordering of terms in input data 204. In one example, an input 204 can include a string-formatted name "Jonathan Wulfric Brian Smith," and the encoder 105 can determine that "Jonathan" corresponds to a given name, "Smith" corresponds to a family name, and terms "Wulfric" and "Brian" correspond to middle names. In this example, the encoder 105 can generate an encoded representation 210 for each term of the input 204. Continuing the example, the encoder 105 can generate a smoothed representation 213 by applying a Gaussian kernel and a weight value to each encoded representation 210 and summing the encoded representations 210 according to the weight values. In this example, the encoder 105 may be agnostic as to an order of the terms in the input data 204, because the resultant smoothed representation 213 can accurately represent the PII in matching processes, such as a search process, regardless of an ordering by which terms of the legal name are submitted in a query and regardless of whether the full legal name is submitted or a sub-section thereof (e.g., given name and family name only).

At step 215, the process 200 includes generating a normalized fixed-sized representation (FXR) 216. According to one embodiment, generating the normalized FXR 216 includes transforming the smoothed representation 213 to a unit vector, such as a normalized floating point vector. In at least one embodiment, the hash processor 107 applies a unit vector normalization according to Equation 2, in which x represents the smoothed representation 213 and y represents the normalized FXR 216.

$$y = \frac{x}{\|x\|} \quad \text{(Equation 2)}$$

In one example, the encoder 105 may segregate a name input "Muhammad Ali" into bi-grams, generates encoded representations 210 based on the bi-gram values, and applies a combination function to the encoded representations 210 to generate a smoothed representation 213. Continuing the example, the encoder 105 can normalize the smoothed representation 213 into a floating point vector [0.1, 0.5, 0.2, 0.5], thereby providing a normalized FXR 216 of the target name. In one or more embodiments, the normalization of the smoothed representation 213 provides irreversibility in the corresponding normalized FXR 216, because the normalization process results in irreversible loss of information. According to one embodiment, the irreversible normalization of the smoothed representation 213 advantageously improves security and privacy, because the normalized FXR 216 cannot be used to generate, access, or view the input data 204 with 100% fidelity.

In some embodiments, the encoder 105 separately normalizes each encoded representation 210 or smoothed representation 213 of each term of an input 204. For example, for an input of "John Jay Adams," the encoder 105 may generate a discrete, encoded representation 210 of each term (e.g., "John," "Jay," and "Adams"). Continuing the example, the encoder 105 may apply Gaussian kernels of varying width to each encoded representation 210 of each term and perform a weighted linear combination of the encoded representations 210 to generate a smoothed representation 213 of each term. In the same example, the encoder 105 may normalize each smoothed representation 213 to generate a normalized FXR 216 of each term. In at least one embodiment, the encoding system 101 utilizes lower weight values for lower priority input terms and/or utilizes higher weight values for high priority input terms. In one example, an input may include a full name "Jonathan Edward Samuel Benjamin Jacobs" in which "Jonathan" corresponds to a given name, "Jacobs," corresponds to a family name and "Samuels," "Benjamin," and "Jacobs" correspond to middle names. In this example, when generating a smoothed representation 213 of the input, the encoding system may utilize lower weight values for the middle names and/or higher weight values for the given and family names. In some embodiments, selective weighting of composite co-occurrence matrices prior to linear combination allows the encoding system to bias a representation toward fast indexing and retrieval based on the more highly weighted terms. In one example, a first representation may be derived from a first name string and a last name string, and a second representation may be derived from the first name string, the last name string, and a middle name string. In this example, the contribution of the middle name string to the second representation can be assigned a lower weight such that the second representation is similar (e.g., close in distance) to the first representation.

At step 218, the process 200 includes applying a lossy transformation to the normalized FXR 216, thereby generating a token 219. In at least one embodiment, generating the token 219 includes, but is not limited to, concatenating the normalized FXR 216 and a cryptographic key (e.g., or other secret data) to generate a concatenated representation, permuting the concatenated representation with the normalized FXR 216 and/or the cryptographic key to generate a permuted representation, and projecting the permuted representation based on one or more transformation parameters (e.g., pseudorandom projection matrices) to generate the token 219.

In one or more embodiments, the lossy transformation is performed according to one or more embodiments described in:

U.S. application Ser. No. 16/406,978, filed May 8, 2019, entitled "SYSTEMS AND METHODS FOR ENHANCED HASH TRANSFORMATIONS," which claims the benefit of and priority to:
   U.S. Application No. 62/829,825, filed Apr. 5, 2019, entitled "EVERGREEN HASH"; and
   U.S. Application No. 62/668,576, filed May 5, 2018, entitled "THE EVERGREEN HASH";
U.S. application Ser. No. 17/230,684, filed Apr. 14, 2021, entitled "SYSTEMS AND METHODS FOR MULTI-MODAL BIOMETRICS," which claims the benefit of and priority to:
   U.S. Application No. 63/009,809, filed Apr. 14, 2020, entitled "SYSTEMS AND PROCESSES FOR TOUCHLESS BIOMODAL BIOMETRICS"; and
   U.S. Application No. 63/011,447, filed Apr. 17, 2020, entitled "SYSTEMS AND PROCESSES FOR TOUCHLESS BIOMODAL BIOMOETRICS"; or
U.S. application Ser. No. 16/841,269, now U.S. Pat. No. 11,301,586, filed Apr. 6, 2020, entitled "SYSTEMS AND METHODS FOR LOSSY BIOMETRIC REPRESENTATIONS," which claims the benefit of and priority to U.S. 62/829,825, filed Apr. 5, 2019, entitled "THE EVERGREEN HASH";
each of which are incorporated herein by reference as if fully set forth in their entireties.

In some embodiments, the token 219 is referred to as an transformed, privacy-secured (TPS) template, Evergreen (Eg)Hash, or fuzzy, irreversibly transformed $(IT)^2$ token.

According to one embodiment, the lossy transformation is distance-preserving, thereby providing accurately preserving the information encoded by the normalized, FXR representation 216. In one or more embodiments, the lossy transformation includes In various embodiments, the token 219 is a byte vector in which each value from the FXR representation takes a value between −127 to 128. In one or more embodiments, the transformation from a floating point vector to a byte vector reduces a magnitude of storage required to store the representation and, thereby, allows for data dense, compact representation of the input data 204. In one or more embodiments, the hash processor 107 generates the token 219 as a 64 byte, 128 byte, 256 byte, or 512 byte vector.

According to one embodiment, the final size of the token 219 may be configurable between the previously listed values, or another suitable size.

At step 221, the process 200 includes performing one or more appropriate actions. In various embodiments, the actions include, but are not limited to, transmitting and/or storing encoded data, generating a user account and/or validating a user account based on encoded data, performing an identification or validation to determine or verify an identity of a subject with which encoded data is associated, causing a locking mechanism to unlock or lock, causing a gateway to be opened or closed (e.g., a physical gateway, such as a door, or a digital gateway, such as access to a particular set of computing resources), providing a subject access to a particular computing environment or networking address, initiating financial transactions, providing digital signatures, or any other action as will occur to one of ordinary skill in the art. In one example, the encoding system 101 may register a subject with which the token 219 is associated by storing the token 219 in the registry 111. In another example, the encoding system 101 may transmit a fixed-size representation 216 to an external system 102. In another example, the encoding system 101 (or a system in communication therewith) can receive additional input data 204, encodes the additional input data 204 into a second token 219, and may perform a comparison process to verify that the second token 219 matches the original token 219. The encoding system 101 can generate scannable media including the token 219, such as, for example, a linear barcode or a two-dimensional barcode (e.g., QR code, PDF417, data matrix, etc.). The encoding system 101 can transmit the scannable media to one or more external systems 102. For example, the encoding system 101 may transmit the scannable media to a computing device for storage in memory thereon (e.g., thereby enabling subsequent retrieval of the scannable media for authentication and identification purposes).

Figure 3:
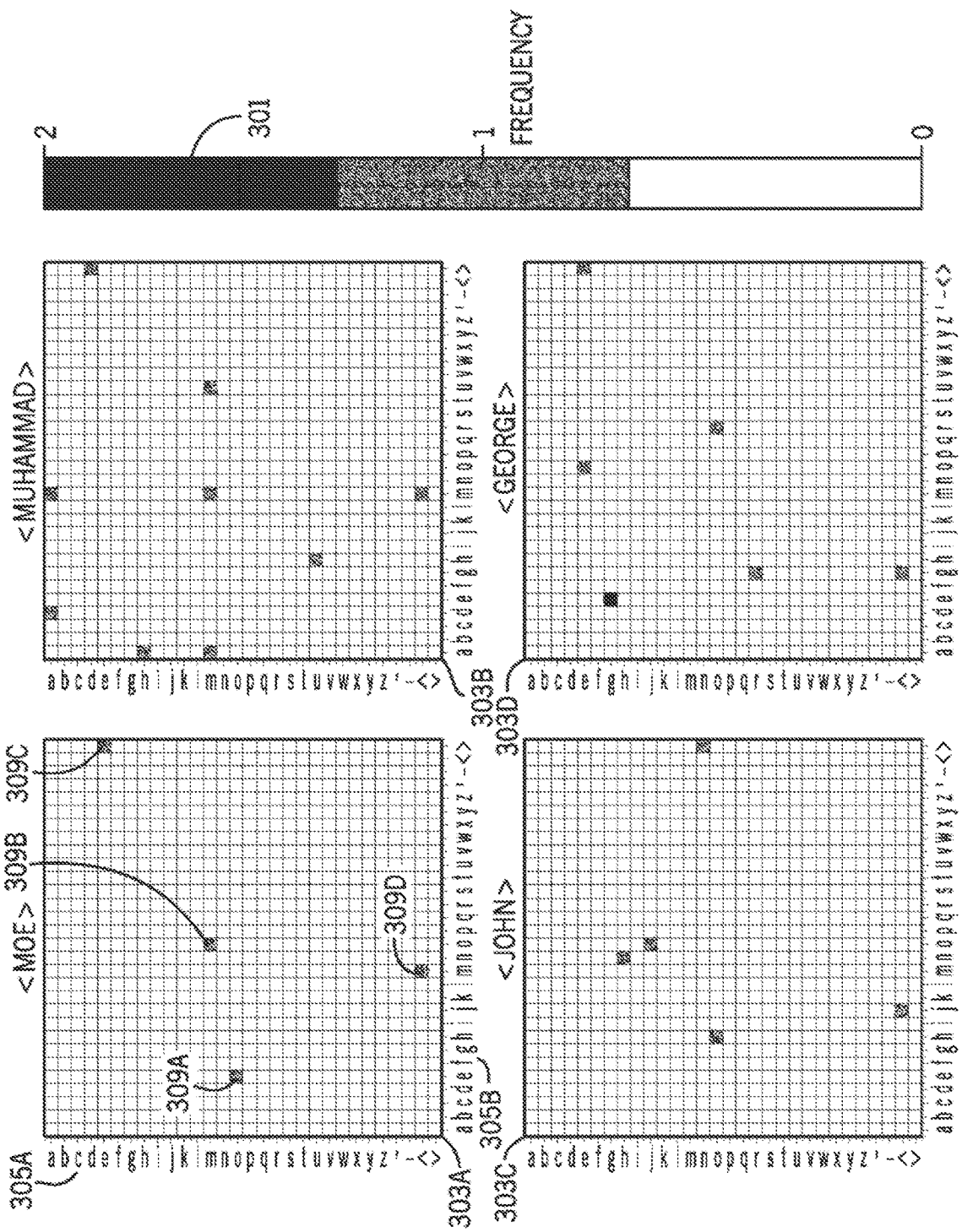
FIG. 3 shows exemplary encoded representations, according to one embodiment of the present disclosure.

FIG. 3 shows exemplary encoded representations 303A-D. In various embodiments, the encoded representation 303A is a co-occurrence matrix of the distribution of values 305A, 305B in bi-grams 307A-D generated from input data 204. According to one embodiment, each bi-gram 307A-D is labeled according to frequency 301. As one example, the encoder 105 segregates input data "<moe>" into bi-grams <m, mo, oe, and e>. Continuing the example, the encoder 105 may generate an encoded representation of the bi-grams by mapping the bi-grams onto a co-occurrence matrix of possible bi-gram values (e.g., a,b,c,d,e,f,g,h,i,j,k,l,m,n,o,p,q,r,s,t,u,v,w,x,y,Z,−',0,1,2,3,4,5,6,7,8,9,<,>) and labeling the mapped bi-grams according to a frequency with which the values thereof appear (e.g., a frequency of one due the single appearance of each bi-gram).

As shown in FIG. 3, encoded representations allow for unique representation and differentiation of various inputs. For example, the encoded representations 303A-D may encode input strings "<moe>," "<john>," "<muhammad>," and "<george>" respectively, and the encoded representations 303A-D may be detectably dissimilar, thereby uniquely and compactly preserving the input strings.

Figure 4:
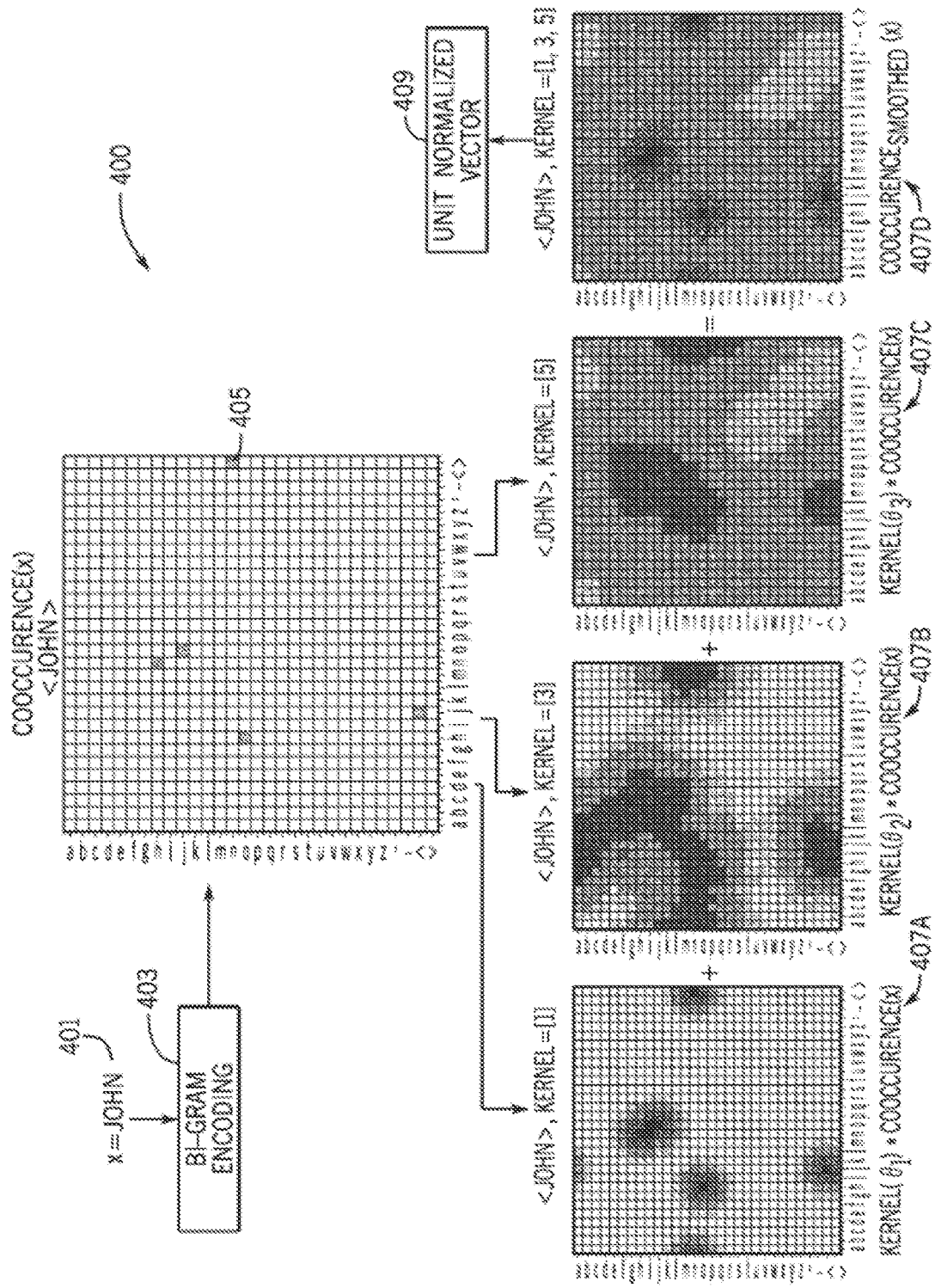
FIG. 4 shows an exemplary encoding workflow, according to one embodiment of the present disclosure.

FIG. 4 shows an exemplary encoding workflow 400 performed by the encoding system 101, according to one embodiment. According to one embodiment, the encoding workflow 400 includes receiving an input 401 and encoding the input 401 into bi-grams 403. In one or more embodiments, the encoding system 101 translates the bi-grams 403 to a co-occurrence matrix 405 (e.g., an encoded representation). In at least one embodiment, the encoding system 101 applies Gaussian kernels of varying width (e.g., 1, 3, and 5, or any suitable combination of varying width values) to the co-occurrence matrix 405 via convolution and, thereby, generates convoluted co-occurrence matrices 407A-C. In various embodiments, the encoding system 101 performs a weighted linear combination of the convoluted co-occurrence matrices 407A-C and, thereby, generates a smoothed co-occurrence matrix 407. In at least one embodiment, the encoding system 101 further transforms the smoothed co-occurrence matrix 407 into a unit vector via normalization, and applies a lossy transformation function to translate the normalized representation to a privacy-secured token (not shown).

Figure 5:
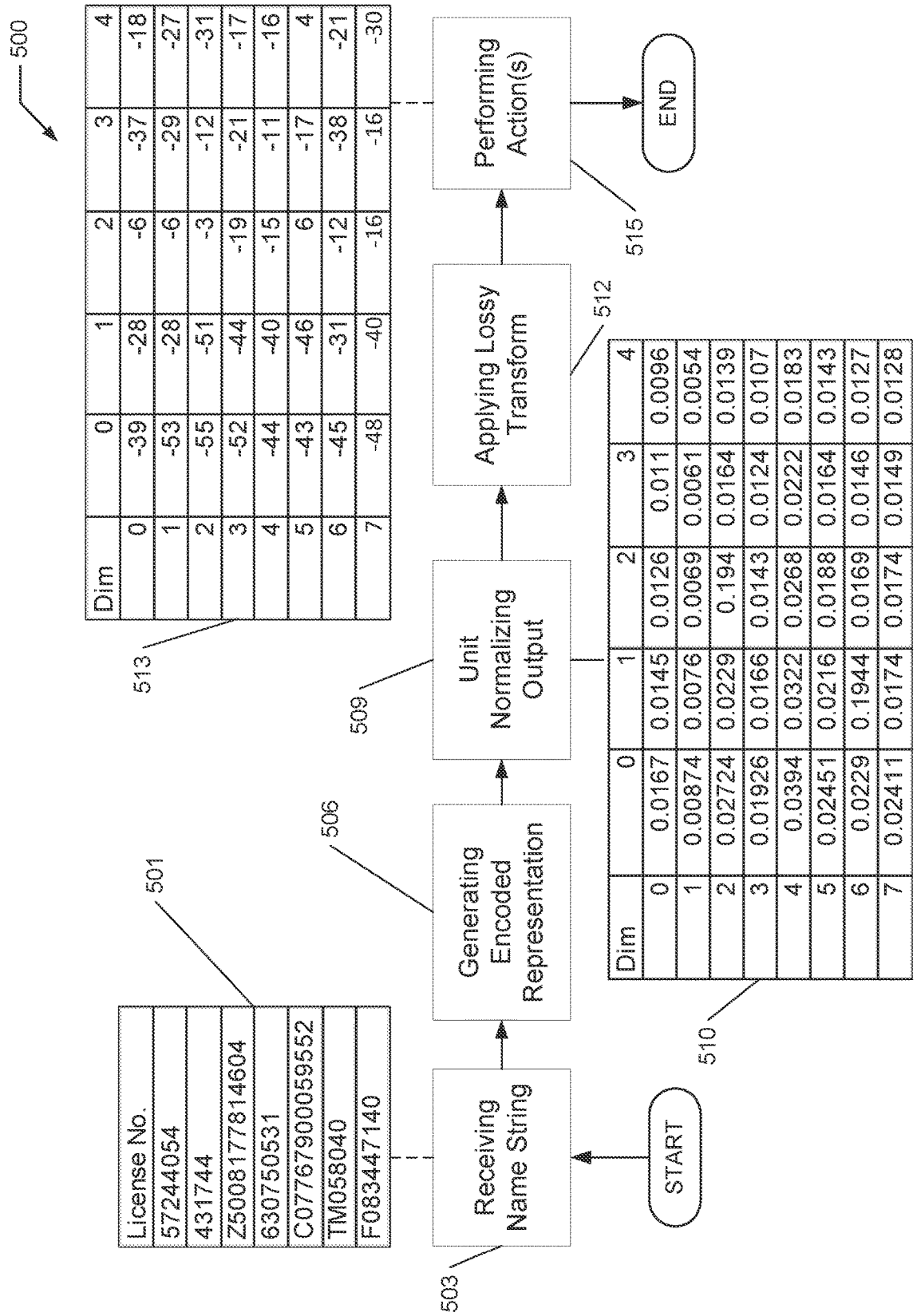
FIG. 5 shows an exemplary encoding workflow, according to one embodiment of the present disclosure.

FIG. 5 shows an exemplary encoding workflow 500 in the context of generating fixed-sized, privacy-secured representations of a name string 501 including a dataset of driver's license numbers. At step 503, an encoding system (e.g., an encoding system 101 as shown in FIG. 1) receives the name string 501 as an input. In some embodiments, the encoding system receives metadata 113 including a state with which the driver's license numbers are associated. In at least one embodiment, the encoding system appends state codes to corresponding license numbers of the name string 501 (e.g., based on the metadata 113).

At step 506, the encoding system generates an encoded representation of the name string 501. According to one embodiment, for each license number from the name string 501, the encoded representation includes a representation of the license number as defined by a set of floating point values.

At step 509, the encoding system normalizes the encoded representation of step 506 to generate a normalized, fixed-sized representation (FXR) 510. In some embodiments, the encoding system proceeds to step 515 and performs an action, such as transmitting the normalized FXR 510 to an external system or storing the normalized FXR 510 in a registry.

At step 512, the encoding system applies a lossy transform to the normalized FXR 510 to generate a token 513. In some embodiments, the lossy transform translates the normalized FXR 510 from a set of floating point values to a discrete byte value ranging from −127 to +128. In at least one embodiment, the encoding system generates a token 513 for reach license number of the name string 501.

At step 515, the encoding system performs one or more actions, such as, for example transmitting the token 513, storing the token 513 in a registry, or generating a user profile based on the token 513. In one example, the encoding system can compare the token 513 to a second token 513 for the purposes of verifying an identity of a subject with which the first token 513 is associated. In another example, to identify a subject with which the token 513 is associated, the encoding system can perform a one-to-many comparison process between the token 513 and a set of stored tokens. In this example, the encoding system can generate a set of similarity scores and ranks the stored tokens according to their corresponding similarity score. Continuing the example, the encoding system can determine that a top-ranked stored token demonstrates a similarity score that satisfies a predetermined threshold. In the same example, based on determining that the predetermined threshold is satisfied, the encoding system can determine that an identity with which the top-ranked token is associated is the identity of the subject with which the token 219 is associated.

Figure 6:
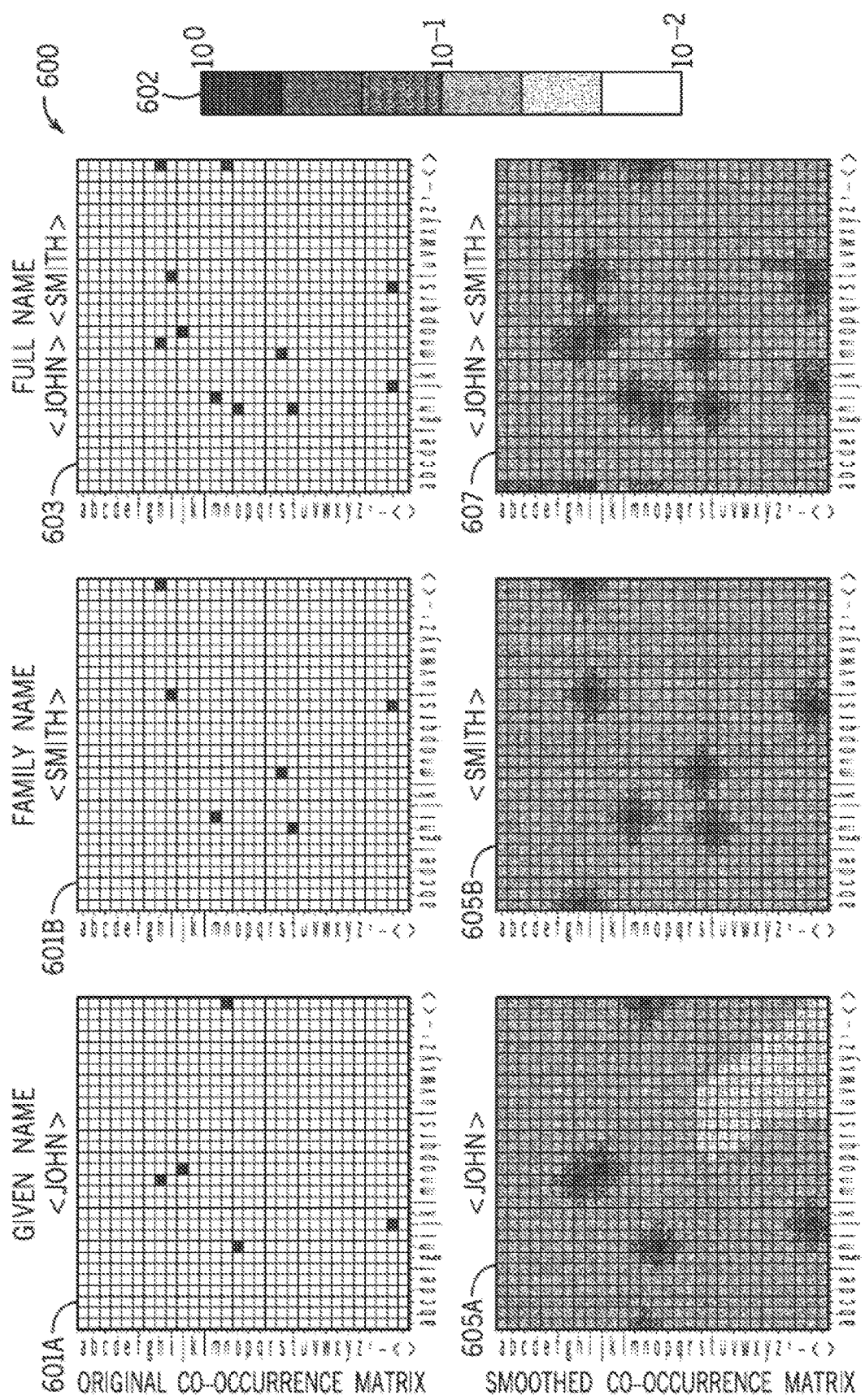
FIG. 6 shows exemplary encoded representations, according to one embodiment of the present disclosure.

FIG. 6 shows exemplary encoded representations 601A-B, 603A-B, and 605A-B. In one or more embodiments, the encoded representations 601A-B, 603A-B, and 605A-B are co-occurrence matrices that record bi-gram value frequency 602. According to one embodiment, the encoded representations 601A, 603A are co-occurrence matrices generated based on encoded bi-gram values from string inputs "<john>" and "<smith>." Thus the encoded representation 601A can represent a given name "<john>" and the encoded representation 603A can represent a family name "<smith>." In at least one embodiment, the encoded representation 603 is a linear combination of the encoded representations 601A and 603A such that the encoded representation 603 is fixed-size representation of the full name "<john><smith>."

In one or more embodiments, the encoded representations 601B, 603B are smoothed co-occurrence matrices generated by applying Gaussian kernels of varying width to the encoded representations 601A, 603A via convolution. According to one embodiment, the encoded representation 605B is a smoothed co-occurrence matrix generated by linear combination of the encoded representations 601B, 603B according to Equation 3. In various embodiments, the encoded representation 607 is a fixed-size representation of the string input "<john><smith>."

Exemplary Experimental Results

The following section describes one or more experimental tests, and results thereof, performed on one or more embodiments of systems and methods described herein. The descriptions therein are provided for the purposes of illustrating various elements of the systems and methods (e.g., as observed in the one or more embodiments). All descriptions, embodiments, and the like are exemplary in nature and place no limitations on any embodiment described or anticipated herein.

To demonstrate efficacy of the various encoding processes described herein under various scenarios, experimental matching protocols were performed using encoded representations generated from publicly accessible and/or randomly generated data. According to one embodiment, the experimental data includes mated and non-mated samples. "Mated" samples generally refer to two or more data objects (e.g., family names, given names, etc.) that are associated with the same subject, and "non-mated" samples generally refer to two or more data objects that are not associated with the same subject.

Figure 7:
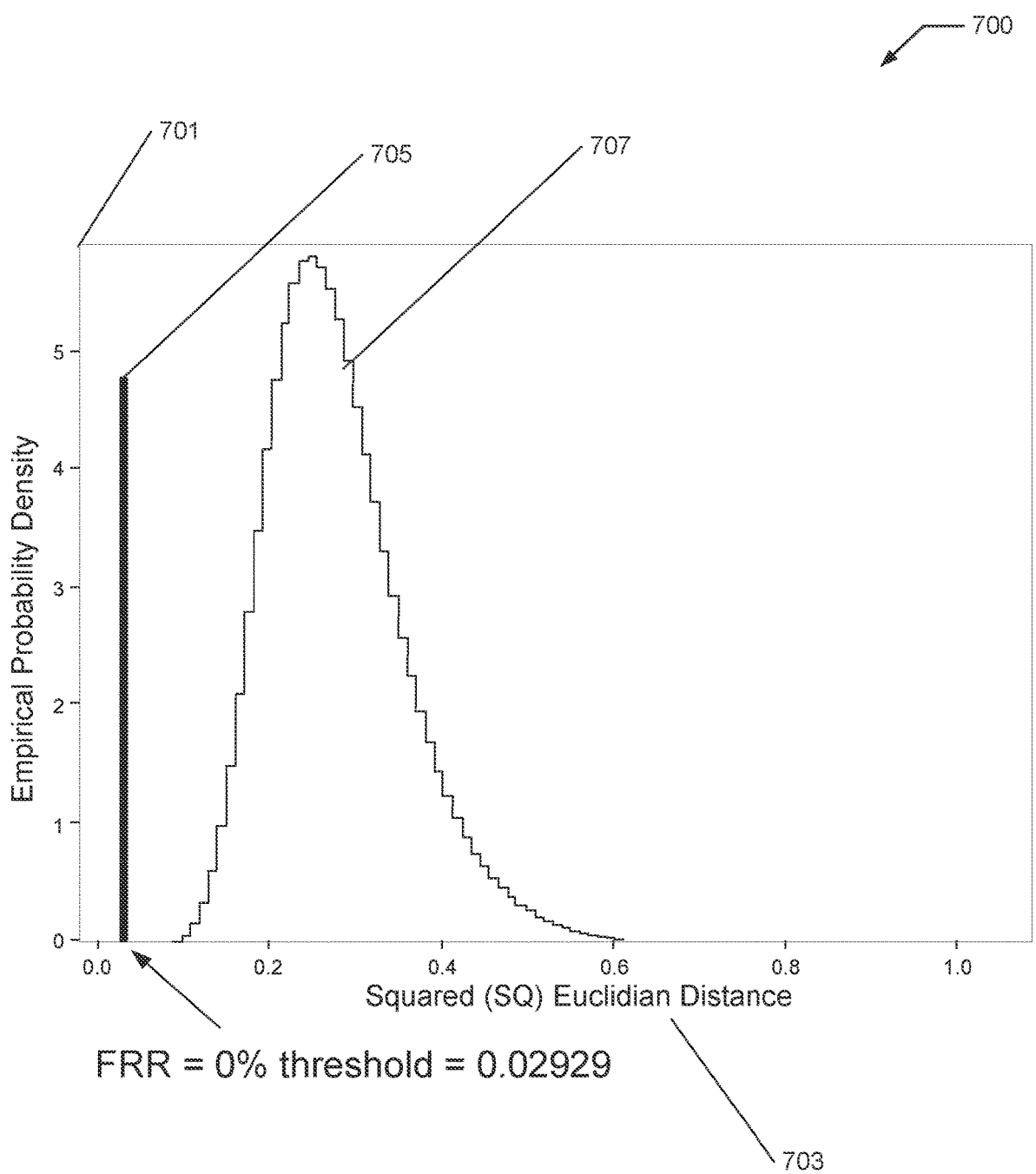
FIG. 7 is a chart of exemplary matching performance, according to one embodiment of the present disclosure.

Referring now to FIG. 7, shown is a chart 700 of exemplary matching performance that relates empirical probability density 701, a measure of matching accuracy, to squared Euclidean distance 703, a comparison score computed between samples (e.g., encoded representations).

In a first protocol, the encoding system generates encoded representations of a set of given names without misspellings. The encoding system compares the encoded representations to each other by calculating a distance metric (e.g., a squared Euclidean distance) between the encoded representations. In at least one embodiment, to generate mated comparison scores, unique given names are compared with each other, resulting in a distribution of distance scores with a mean of zero and a standard deviation of zero. In the chart 700, due to the absence of misspellings, a distribution of the mated comparisons would demonstrate zero mean and zero variance (e.g., the distribution may be modeled in the chart 700 as a dirac delta function centered on zero).

In at least one embodiment, the chart 700 includes a non-mated distribution 705 and a false rejection rate (FRR)

threshold 707. According to one embodiment, to generated non-mated comparison scores represented in the non-mated distribution 705, every given name is matched with every over given name, resulting in N*(N−1)/2 scores if there are N unique given names. In various embodiments, FRR generally refers to an estimate of the probability that two instances of a name string are declared as different. In at least one embodiment, the FRR threshold 707 indicates the maximum tolerable threshold to operate at 0% FRR. According to one embodiment, the FRR threshold 707 for the non-mated distribution 705 is 0.03.

Figure 8:
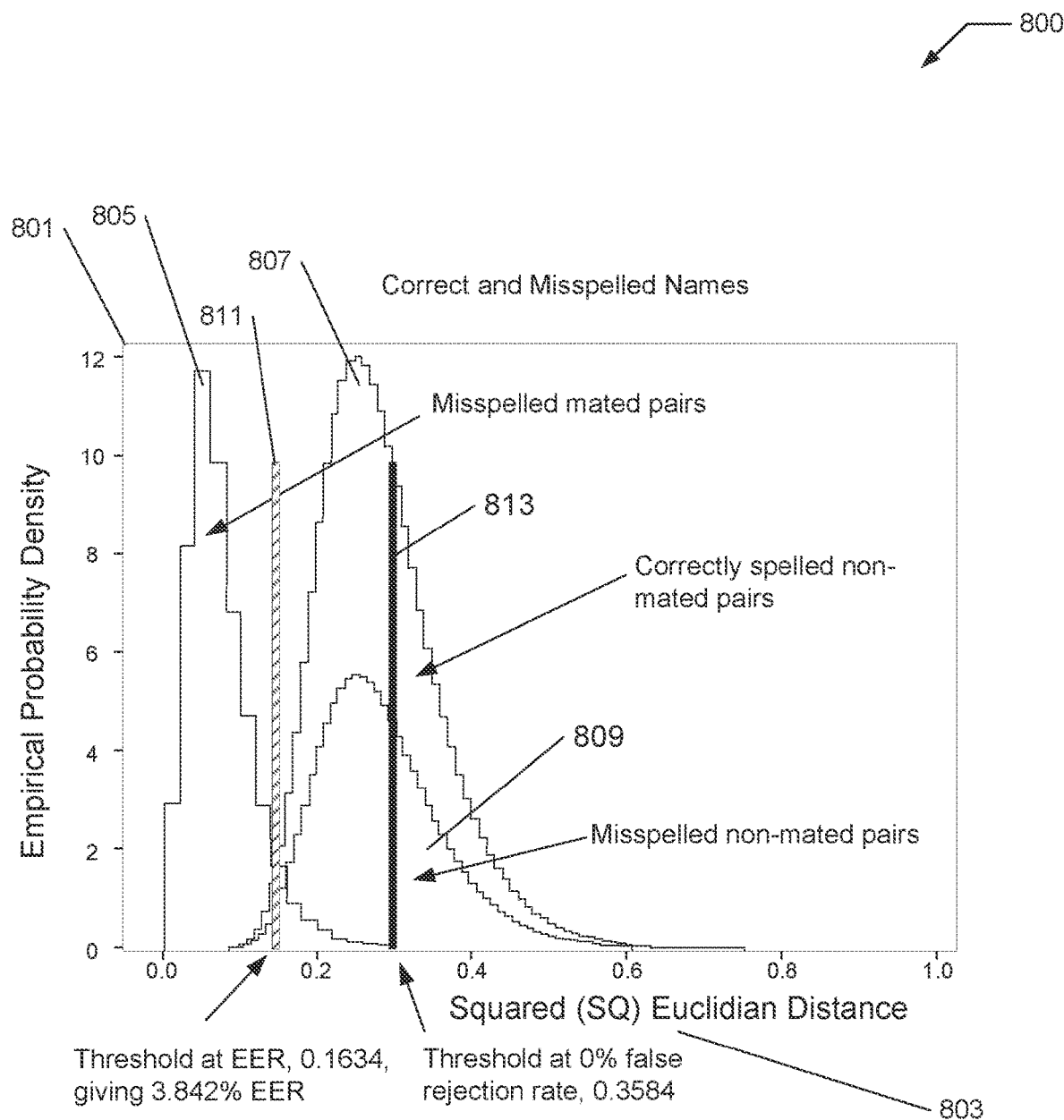
FIG. 8 is a chart of exemplary matching performance, according to one embodiment of the present disclosure.

FIG. 8 shows an exemplary chart 800 of matching performance in which the distance between two samples 801 is measured as a function of squared (SQ) Euclidian distance 803. In a second protocol, the encoding system generates encoded representations of a set of given names with misspellings. According to one embodiment, misspelled versions of the given names are generated by swapping one or more characters thereof while preserving uniqueness across mated names and misspellings (e.g., a misspelled version of a name is not a correct spelling of another name).

In at least one embodiment, the chart 800 includes a misspelled, mated distribution 805, a correctly spelled, non-mated distribution 807, and a misspelled, non-mated distribution 809. In at least one embodiment, to generate mated comparison scores, the encoding system compares the encoded representation of a correctly spelled name (e.g., a reference representation) to an encoded representation of an incorrectly spelled name (e.g., a probe representation). For example, the encoding system may compare an encoded representation of "simon" to an encoded representation of "smion." In one or more embodiments, to generated non-mated comparison scores, the encoding system compares encoded representations of two different names (e.g., regardless of whether the reference representation or the probe representation is correctly spelled).

In various embodiments, the chart 800 includes an equal error rate (EER) threshold 811. As used herein, EER generally refers to an operating point at which false rejection rate (FRR) is equal to false acceptance rate (FAR) (e.g., an empirical estimate of the probability that representations of two differently named strings are classified as the same). According to one embodiment, for the misspelled, mated distribution 805, the encoding system demonstrates an EER of 3.74%, which may define the EER threshold 811 as occurring at an SQ Euclidean distance 803 of about 0.16. In at least one embodiment, the EER threshold 811 is utilized to ensure robustness of the present encoding solutions to misspelling. In at least one embodiment, the EER of the second protocol demonstrates that the present encoding solution is efficacious in matching misspelled names. In one or more embodiments, the chart 800 includes an FRR threshold 813 that indicates the maximum tolerable threshold to operate at 0% FRR. According to one embodiment, the FRR threshold 813 for the non-mated distribution 807 and misspelled, non-mated distribution 809 occurs at an SQ Euclidean distance 803 of about 0.35854.

Figure 9:
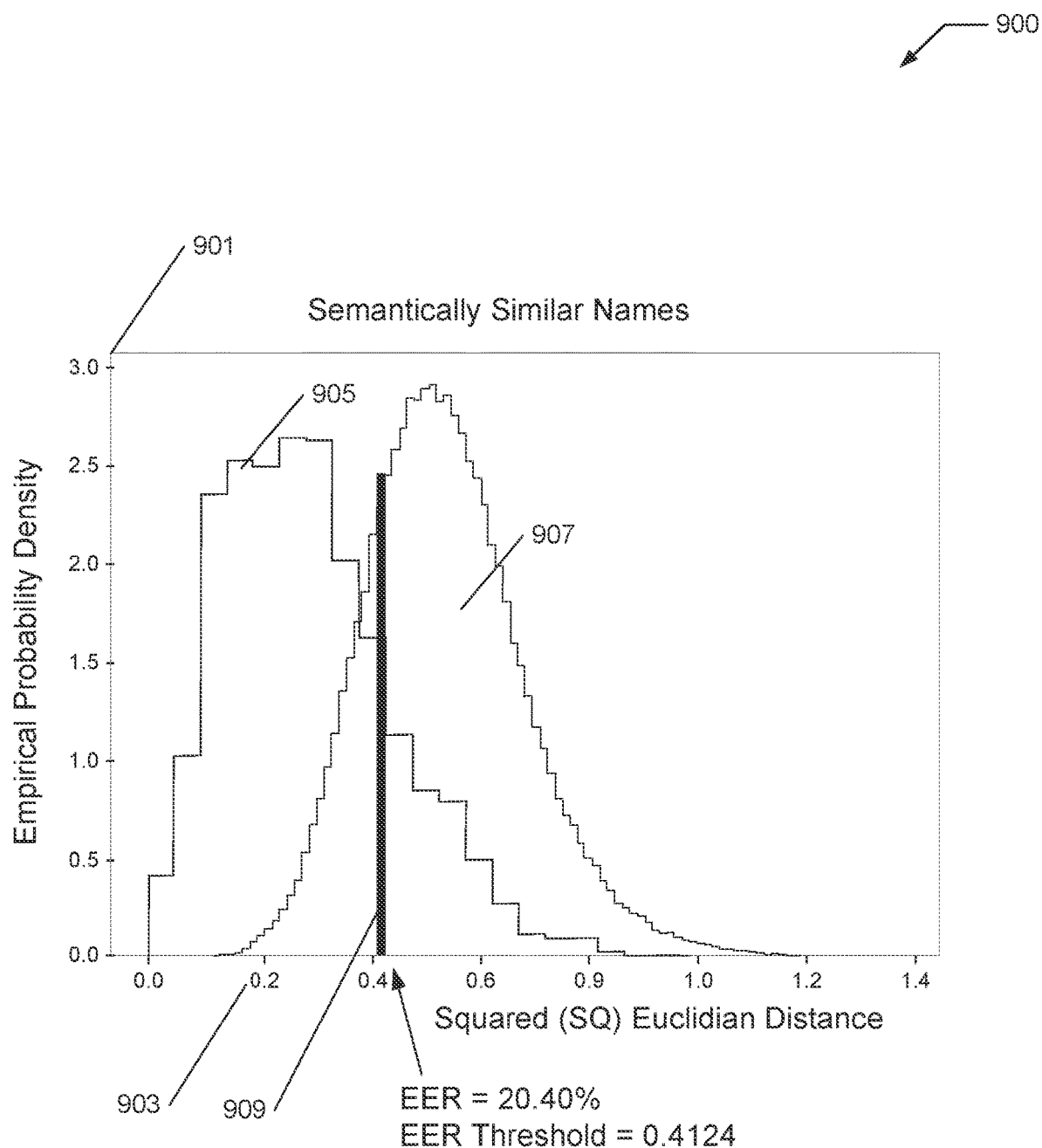
FIG. 9 is a chart of exemplary matching performance, according to one embodiment of the present disclosure.

FIG. 9 shows an exemplary chart 900 of matching performance in which the distance between two samples 901 is measured as a function of squared (SQ) Euclidian distance 903. In a third protocol, the encoding system generates and compares encoded representations of a set of given names with semantic similarity. For example, the encoding system may generate and compare encoded representations of semantically similar names "Abraham," "Avraham" (e.g., a Hebrew-derived iteration), and "Ibrahim" (e.g., an Arabic-derived iteration). In at least one embodiment, the encoding system leverages a dataset of root names and derived names with which a particular root name is associated.

In at least one embodiment, the chart 900 includes a mated distribution 905 and a non-mated distribution 907. In at least one embodiment, to generate mated comparison scores, the encoding system compares the encoded representation of a root name to an encoded representation of a semantically similar name (also referred to as a "derivative name"). For example, the encoding system can compare an encoded representation of root name "John" to encoded representations of derivative names "Juan" and "Johan." In one or more embodiments, to generated non-mated comparison scores, the encoding system compares encoded representations of two names that are not associated with the same root name.

In various embodiments, the chart 900 includes an equal error rate (EER) threshold 909. According to one embodiment, the encoding system demonstrates an EER of 20.74%, which may define the EER threshold 909 as occurring at an SQ Euclidean distance 903 of about 0.4124. In at least one embodiment, the EER of the third protocol demonstrates that the present encoding solution is efficacious in matching semantically similar names.

Figure 10:
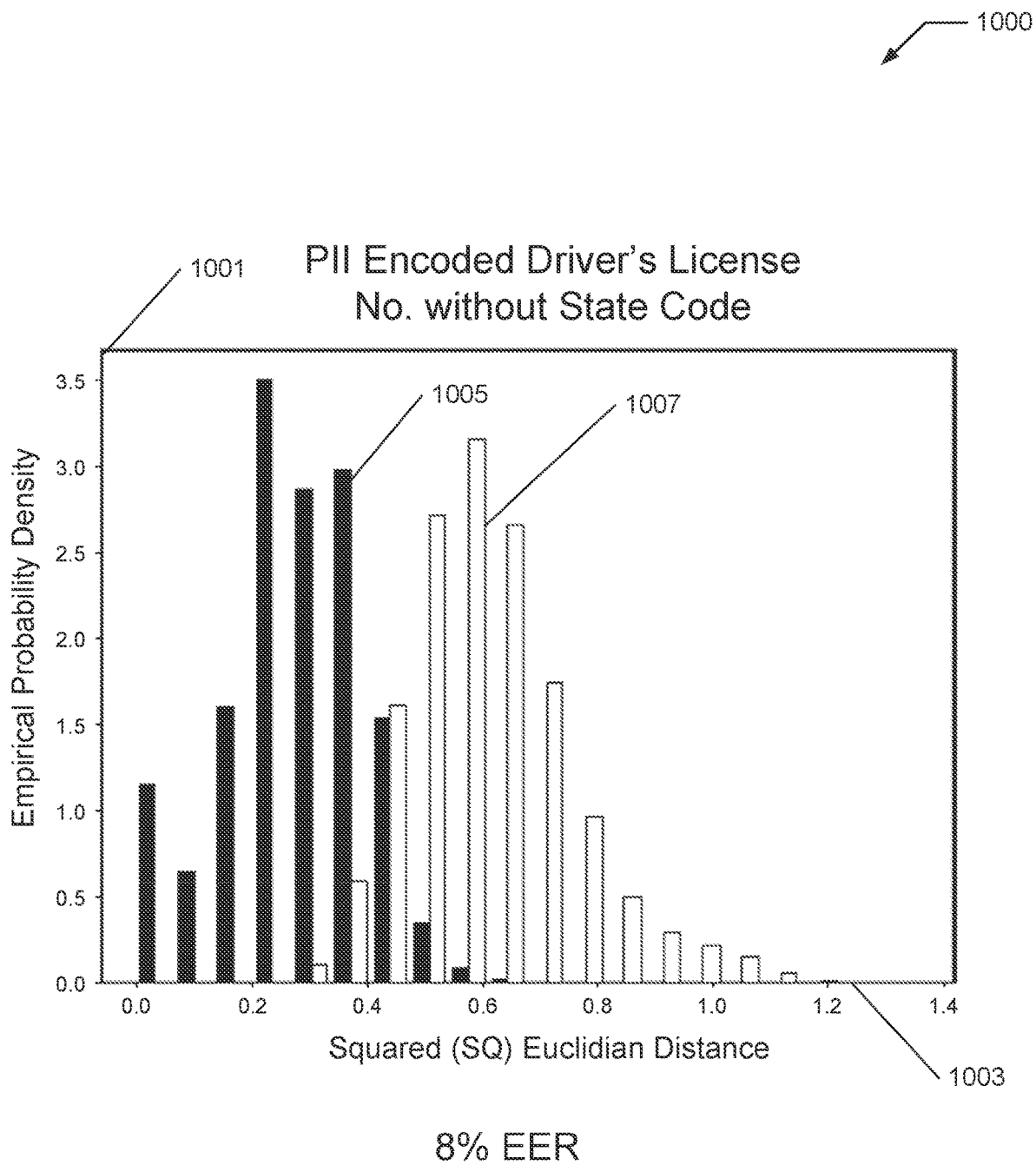
FIG. 10 is a chart of exemplary matching performance, according to one embodiment of the present disclosure.

FIG. 10 shows an exemplary chart 1000 of matching performance in which the distance between two samples 1001 is measured as a function of squared Euclidian (SQ) distance 1003. In a fourth protocol, the encoding system generates encoded representations of a set of 9,628 U.S. driver's license numbers. According to one embodiment, each encoded representation demonstrates 1,628 dimensions. In various embodiments, the chart 1000 includes a mated species 1005 and a non-mated species 1007. In at least one embodiment, to generate mated comparison scores represented by the mated species 1005, the encoding system compares an encoded representation of an original driver's license number to an encoded representation of a misspelled version of the same driver's license. In one or more embodiments, to generated non-mated scores represented by the non-mated species 1007, the encoding system compares encoded representations of unrelated driver's license numbers. In various embodiments, the chart 1000 shows that the encoding system performed at an ERR of 8.0%.

Figure 11:
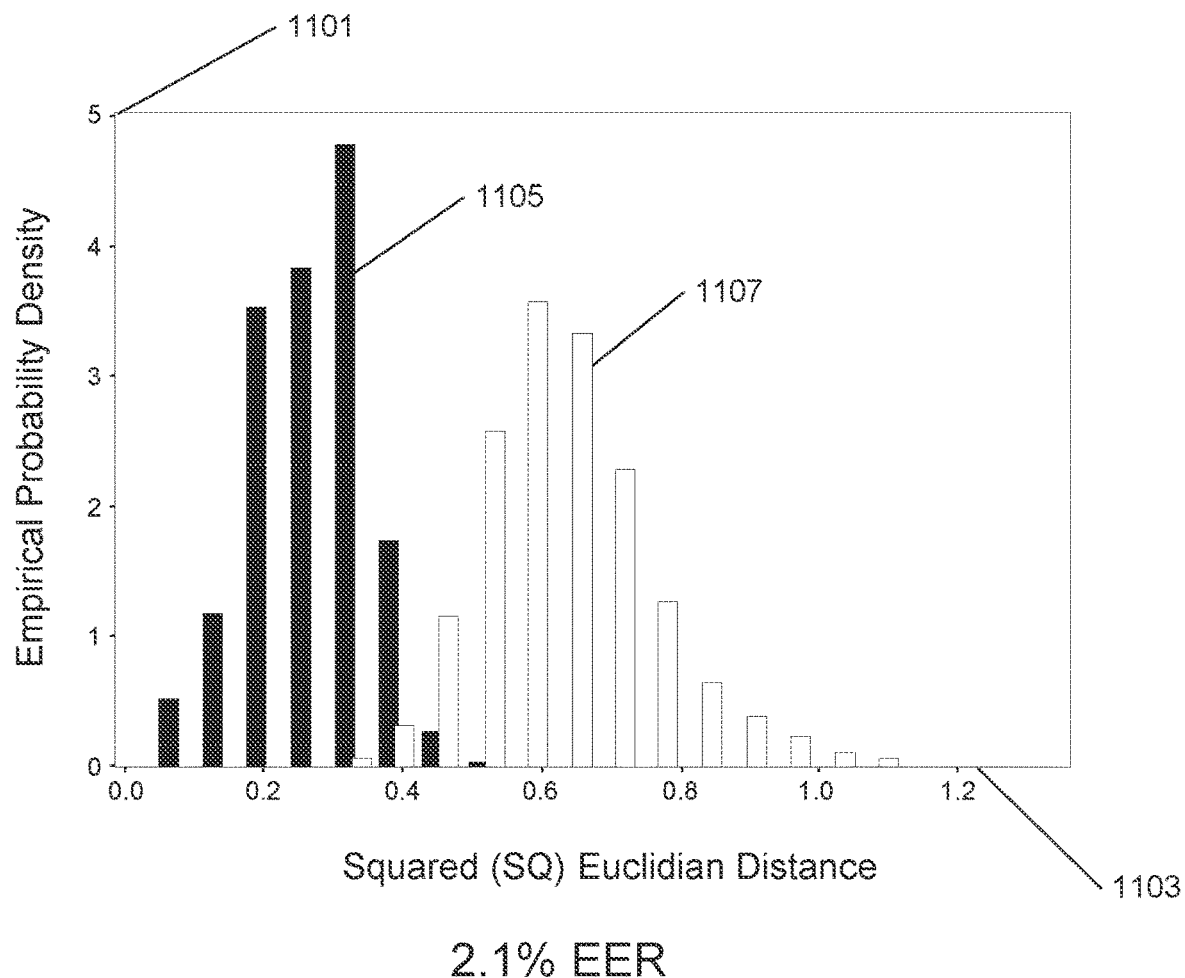
FIG. 11 is a chart of exemplary matching performance, according to one embodiment of the present disclosure.

FIG. 11 shows an exemplary chart 1100 of matching performance in which the distance between two samples 1101 is measured as a function of squared (SQ) Euclidian distance 1103. In a fifth protocol, the encoding system generates encoded representations of a set of 9,628 U.S. driver's license numbers after first appending a state code to each driver's license number as shown in Table 3. According to one embodiment, each encoded representation demonstrates 1,628 dimensions.

TABLE 3

Appending State Code to Driver's License Numbers

| Driver's License Numbers | State Code-Appended Driver's License Numbers |
|---|---|
| 0572440454 | AL0572440454 |
| 4317144 | CT4317144 |
| Z5008177814604 | GAZ5008177814604 |
| 630750531 | MD630750531 |
| C07767900059552 | OHC07767900059552 |
| TM058040 | PATM058040 |
| F083447140 | WYF083447140 |

In various embodiments, the chart 1100 includes a mated distribution 1105 and a non-mated distribution 1107. In one or more embodiments, the chart 1100 shows that the encoding system performed at an ERR of 2.1%. In at least one embodiment, the chart 1000 (FIG. 10) and chart 1100 demonstrate that accuracy of the encoding system is advantageously improved by pre-processing input data (e.g., driver's license numbers) to append classification information (e.g., state codes).

Figure 12:
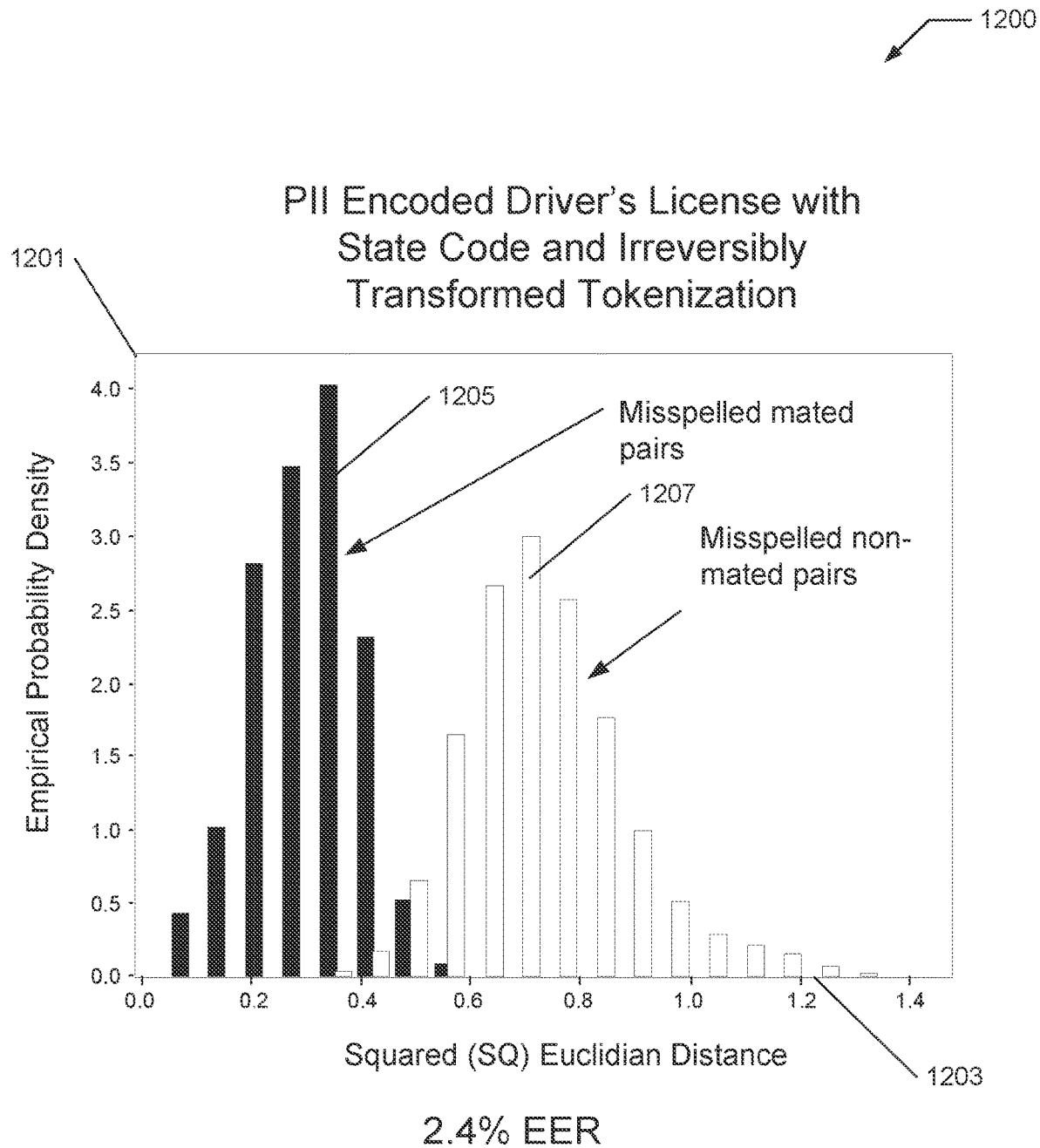
FIG. 12 is a chart of exemplary matching performance, according to one embodiment of the present disclosure.

FIG. 12 shows an exemplary chart 1200 of matching performance in which the distance between two samples 1201 is measured as a function of squared Euclidian (SQ) distance 1203. In a sixth protocol, the encoding system generates irreversibly transformed tokens that represent a set of 9,628 U.S. driver's license numbers with state codes appended thereto. In various embodiments, the chart 1000 includes a mated species 1205 and a non-mated species 1207. In at least one embodiment, to generate mated comparison scores of the mated species 1205, the encoding system compares a token of an original driver's license number to a token of a misspelled version of the same driver's license number. In one or more embodiments, to generated non-mated scores represented of the non-mated species 1207, the encoding system compares tokens of unrelated driver's license numbers. In various embodiments, the chart 1200 shows that the encoding system performed at an ERR of 2.4% and thus the chart 1200 demonstrates that the tokens generated by the encoding system offer a comparable level of matching accuracy while advantageously providing for irreversible, revocable, and un-linkable representations of PII.

Additional Description of Exemplary Embodiments

In various embodiments, FIGS. 13A-B, 14, and 15, and accompanying description, provide exemplary processes for generating exact tokens and fuzzy tokens for representing PII data. In one or more embodiments, the present encoding systems may perform exact tokenization in instances where random errors in input PII data are not expected. In at least one embodiment, the present encoding systems may perform fuzzy tokenization in instances where random errors in input PII data may be present. For example, the encoding system may perform exact tokenization to generate exact tokens of PII data stored in a barcode or database. In the same example, the encoding system may perform fuzzy tokenization to generate fuzzy tokens of PII data obtained from an identity document via optical character recognition (e.g., the output of which may include errors). In at least one embodiments, matching exact tokens (e.g., for identification, verification, deduplication, etc.) includes generating a similarity score or dissimilarity score (e.g., via a distance function or other suitable technique) and comparing the score to a predetermined error threshold. According to one embodiment, the predetermined error threshold for exact token matching is set to an arbitrary small value. In one or more embodiments, matching fuzzy tokens includes generating a similarity or dissimilarity delta and comparing the score to a delta threshold. In various embodiments, the delta threshold for fuzzy token matching is experimentally determined based on token generation and matching training performed on one or more sets of representative input data (e.g., PII data).

Figure 14:
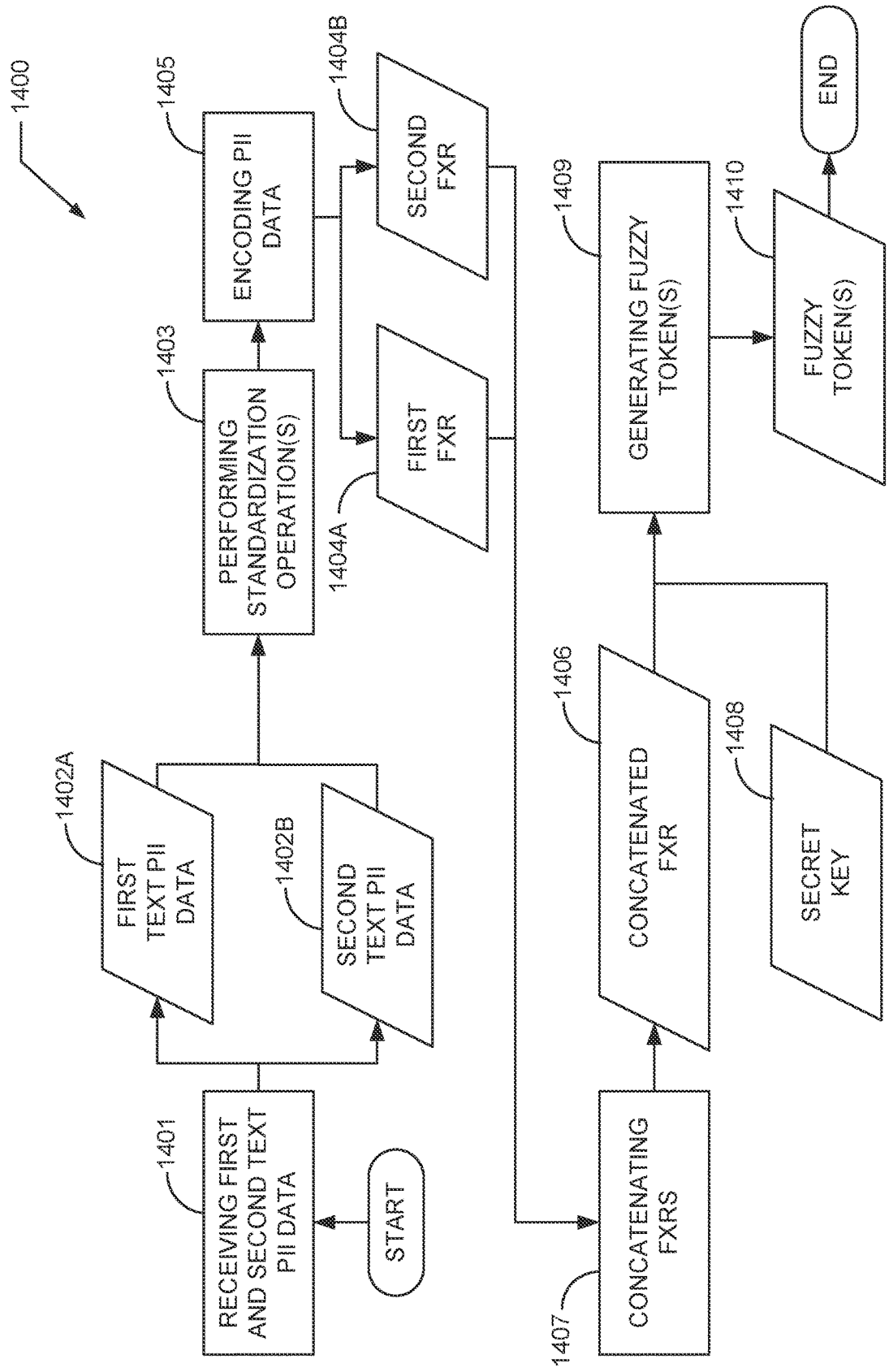
FIG. 14 shows an exemplary combination encoding workflow, according to one embodiment of the present disclosure.
Figure 15:
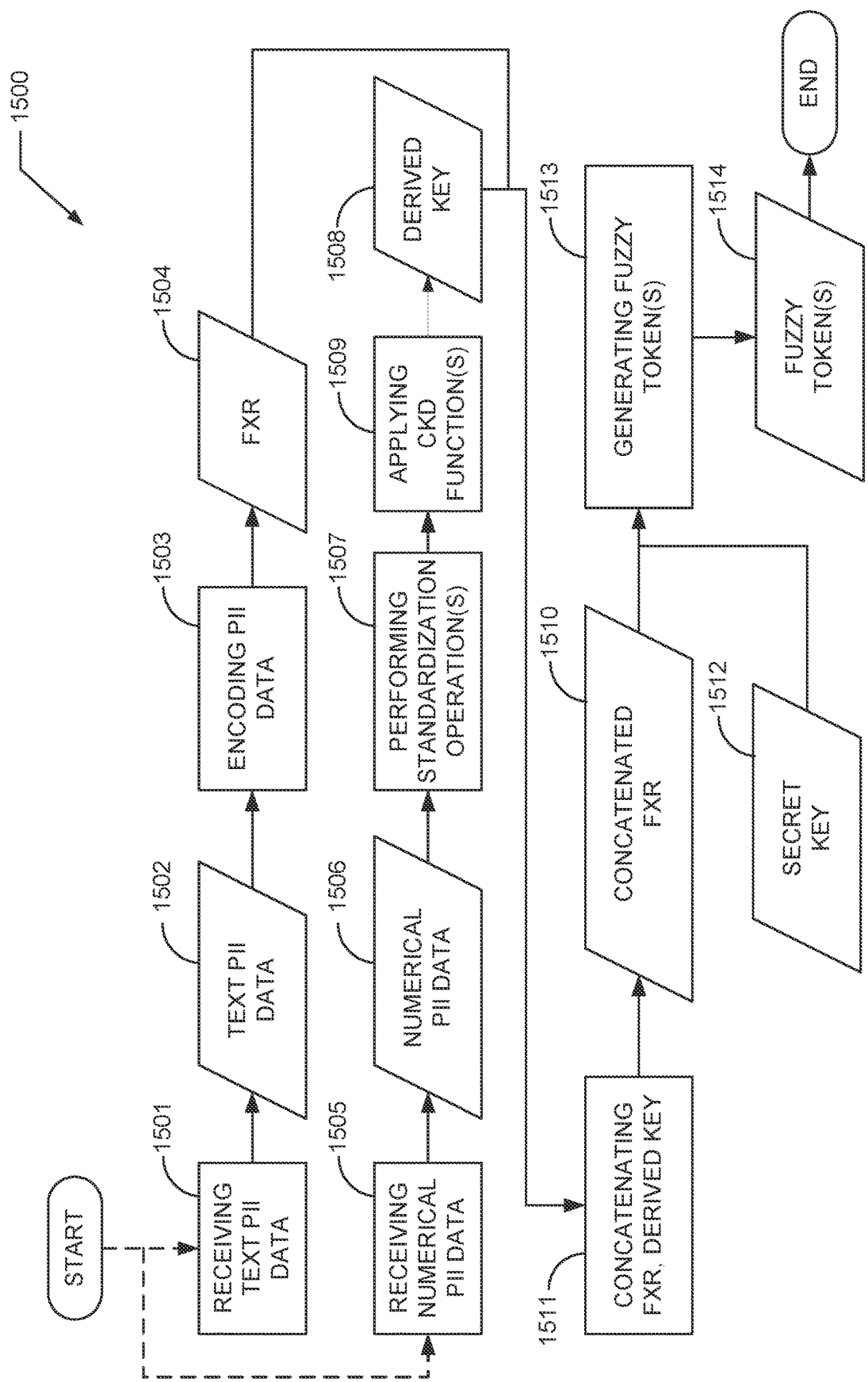
FIG. 15 shows an exemplary hybrid encoding workflow, according to one embodiment of the present disclosure.

According to one embodiment, exact tokenization may be more suitable for tokenizing scalar numbers (e.g., date, time, mass, etc.) due to comparatively increased entropy in the output token (e.g., and/or comparatively decreased entropy in the input space for fuzzy tokenization). In one or more embodiments, as shown in FIGS. 14-15, the present encoding systems and processes may perform exact tokenization and fuzzy tokenization in a combined or hybridized manner to a) generate one or more fuzzy token of first PII data, b) generate one or more exact tokens from second PII data, and c) generate a combined or hybrid fuzzy token based on the one or more fuzzy tokens and the one or more exact tokens.

FIG. 13A shows an exemplary encoding workflow 1300A performed by an embodiment of the present encoding systems, such as the encoding system 101 shown in FIG. 1 and described herein. In various embodiments, the encoding system 101 performs encoding workflow 1300A to transform PII data into one or more fuzzy tokens.

At step 1301, the hash controller 103 receives input data 1302. The input data 1302 includes PII data, such as, for example, character strings for a first name, middle name, last name, or combinations thereof.

At step 1303, the standardization service 104 performs one or more standardization operations on the input data 1302. In one example, the standardization service 104 can convert all character strings of the input data 1302 to a lowercase or uppercase format. In another example, the standardization service 104 can remove one or more characters from the PII data, such as apostrophes, commas, hyphens, or combinations thereof. In this example, the standardization service 104 can remove any spaces created by the removal of the one or more characters.

At step 1305, the encoder 105 encodes the input data 1302 into one or more fixed-sized representations (FXRs) 1306. The encoder 105 can generate the FXR 1306 via one or more encoding processes and/or workflows described herein, such as the encoding processes 200 shown in FIG. 2, the encoding workflow 400 shown in FIG. 4, or the encoding workflow 500 shown in FIG. 5.

At step 1307, the hash processor 107 generates one or more fuzzy tokens 1310 based on the FXR 1305 and a secret key 1308. The hash processor 107 can generate the fuzzy token 1310 according to one or more embodiments described and/or incorporated by reference herein. The secret key 1308 can include any secret information, such as, for example, a password, personal identification number (PIN), keyword, key phrase, device identifier, network identifier, or biometric information (e.g., face scan, handprint, fingerprint, iris scan, voice recording, etc.). The secret key 1308 can include a key or other output from a CKD function or hashing function. For example, the secret key 1308 may be a 256-bit length key. In one or more embodiments, the use of a secret key ensures that a resultant output token is revocable and renewable (e.g., the token can be revoked and be replaced with a new token that has a completely different number but is also representative of the same original PII data, such a feature may be referred to as "diversity").

The encoding system 101 can receive the secret key 1308 from an external system 102 or the hash processor 107 can retrieve the secret key 1308 from the data store 109. In various embodiments, generating the fuzzy token 1310 includes, but is not limited to, concatenating the FXR 1305 and the key 1308 to generate a concatenated representation, permuting the concatenated representation with the FXR 1305 and the key 1308 to generate a permuted representation, and projecting the permuted representation based on one or more transformation parameters (e.g., pseudorandom projection matrices) to generate the fuzzy token 1310.

FIG. 13B shows an exemplary encoding workflow 1300A performed by an embodiment of the present encoding systems, such as the encoding system 101 shown in FIG. 1 and described herein. In various embodiments, the encoding system 101 performs encoding workflow 1300B to transform PII data into one an exact token. In at least one embodiment, the exact token may be reversed via a key and key derivation function to recover the PII data.

At step 1311, the hash controller 103 receives input data 1312 including PII data, such as, for example, character strings for a first name, middle name, last name, or combinations thereof.

At step 1313, the standardization service 104 performs one or more standardization operations on the input data 1312. In one example, the standardization service 104 can convert all character strings of the input data 1312 to a lowercase or uppercase format. In another example, the standardization service 104 can remove one or more characters from the PII data, such as apostrophes, commas, hyphens, or combinations thereof. In this example, the standardization service 104 can remove any spaces created by the removal of the one or more characters.

At step 1315, the hash processor 107 applies one or more cryptographic key derivation (CKD) functions to the standardized input data 1312 and a secret key 1314 to generate an exact token 1316. In some embodiments, the CKD function excludes the secret key 1314, or other secret data input, and the hash processor 107 executes the CKD function on standardized input data exclusively.

The encoding workflows 1300A, B can include performing one or more appropriate actions following generation of the fuzzy token 1310 or the exact token 1316. For example, following step 1307 or 1315, the encoding system 101 may store the fuzzy token 1310 or the exact token 1316. As another example, the encoding system 101 may generate a user account and/or validates user account based on the fuzzy token 1310 or the exact token 1316. In another example, the encoding system 101 may transmit the fuzzy token 1310 or the exact token 1316 to an external system 102, such as a user's computing device. In another example, the encoding system 101 can generate and transmit to a user's computing device scannable media (e.g., a linear or two-dimensional barcode) that includes the fuzzy token 1310 or the exact token 1316.

FIG. 14 shows a combined encoding workflow 1400 performed by an embodiment of the present encoding systems, such as the encoding system 101 shown in FIG. 1 and described herein. The encoding system 101 can perform the encoding workflow 1400, for example, to generate a combined fuzzy token that is derived from and representative of multiple PII data inputs. For the purposes of showing and describing exemplary aspects of the encoding workflow 1400, the present description is provided in the context of encoding first and second PII data; however, no limitation is intended thereby. The workflow 1400 can include receiving and encoding additional text PII data (e.g., third, fourth, fifth, or any suitable number of text PII data inputs).

At step 1401, the hash controller 103 receives first text PII data 1402A and second text PII data 1402B (e.g., text referring to a format of the PII data, such as character strings). The encoding system 101 can receive the first text PII data 1402A or the second text PII data 1402B in a non-text format and convert the data to a text format. For example, the encoding system 101 can receive, as the first text PII data 1402A and second text PII data 1402B, a first audio file and a second audio file. In this example, the encoding system 101 can process the first and second audio files via one or more natural language processing (NLP) techniques, models, or algorithms to generate the first text PII data 1402A and second text PII data 1402B, respectively.

At step 1403, the standardization service 104 performs one or more standardization operations on the first text PII data 1402A and second text PII data 1402B. The encoding system 101 can perform step 1403 similar to steps 1303 or 1313 of the encoding workflows 1300A, 1300B described herein and shown in FIGS. 13A, 13B, respectively.

At step 1405, the encoder 105 separately encodes each of the first text PII data 1402A and second text PII data 1402B to generate a first fixed-size representation (FXR) 1404A and a second FXR 1404B, respectively. The encoder 105 can generate the FXRs 1404A, 1404B via one or more encoding processes and/or workflows described herein, such as the encoding processes 200 shown in FIG. 2, the encoding workflow 400 shown in FIG. 4, or the encoding workflow 500 shown in FIG. 5.

At step 1407, the hash processor 107 concatenates the FXRs 1404A, 1404B to generate a concatenated FXR 1406. Concatenating the FXRs 1404A, 1404B can include, for example, joining the vector values thereof end-to-end.

At step 1409, the hash processor 107 generates one or more fuzzy tokens 1410 based on the concatenated FXR 1406 and a secret key 1408. The hash processor 107 can generate the fuzzy token 1410 according to one or more embodiments described and/or incorporated by reference herein. The secret key 1408 can include any secret information, such as, for example, a cryptographic key generated via a CKD function, a password, personal identification number (PIN), keyword, key phrase, device identifier, network identifier, or biometric information (e.g., face scan, handprint, fingerprint, iris scan, voice recording, etc.). The hash processor 107 can perform step 1409 similar to step 1307 of the encoding workflow 1300A described herein and shown in FIG. 13A.

The encoding workflow 1400 can include performing one or more appropriate actions following generation of the fuzzy token 1410. Non-limiting examples of appropriate actions include transmitting and/or storing the fuzzy token 1410, generating a user account and/or validating a user account based on the fuzzy token 1410, performing an identification or validation to determine or verify an identity of a subject with which the fuzzy token 1410 is associated, causing a locking mechanism to unlock or lock, causing a gateway to be opened or closed (e.g., a physical gateway, such as a door, or a digital gateway, such as access to a particular set of computing resources), providing a subject access to a particular computing environment or networking address, initiating financial transactions, providing digital signatures, generating and transmitting scannable media, or any other action as will occur to one of ordinary skill in the art.

FIG. 15 shows a hybrid encoding workflow 1500 performed by an embodiment of the present encoding systems, such as the encoding system 101 shown in FIG. 1 and described herein. The encoding system 101 can perform the encoding workflow 1500 to generate a hybrid fuzzy token that is derived from and representative of multiple PII data inputs of dissimilar or similar format. For example, the encoding system 101 can perform the workflow 1500 to generate a fuzzy token derived from and representative of a text-based PII input and a numerical PII input. As shown in FIG. 15, steps 1501 and 1505 described herein may occur concurrently, semi-concurrently, or sequentially.

At step 1501, the hash controller 103 receives text PII data 1502, such as, for example, a first name, last name, middle name, address, email, address, or username. The encoding system 10 can receive the text PII data 1502 from an external system 102, such as a user's computing device or a remote data storage environment. The text PII data 1502 input can include only non-numerical characters or can include one or more numerical characters. As further described herein, numerical PII data 1506 may include only numerical characters. In some embodiments, the standardization service 104 performs one or more standardization operations on the text PII data 1502, such as normalizing to a single letter case and removing apostrophes and spaces.

At step 1503, the encoder 105 encodes the text PII data 1502 into one or more fixed-size representations (FXRs) 1504. The encoder 105 can generate the FXR 1504 via one or more encoding processes and/or workflows described herein, such as the encoding processes 200 shown in FIG. 2, the encoding workflow 400 shown in FIG. 4, or the encoding workflow 500 shown in FIG. 5.

At step 1505, the hash controller 103 receives numerical PII data 1506, such as, for example, a date, geolocation coordinates, phone number, driver's license number, passport identification number, device identification number, user account identification number, biometric information (e.g., age, height, weight, heart rate, etc.), or custom numerical input.

At step 1507, the standardization service 104 performs one or more standardization operations on the numerical PII data 1506. In one example, the numerical PII data 1506 can include a phone number "+1-123-456-7890" and the standardization service 104 may perform a standardization operation to convert the numerical PII data 1506 to "11234567890." In another example, the numerical PII data 1506 can include a date "25 Dec. 2022" and the standardization service 104 may perform a standardization operation to convert the numerical PII data 1506 to "20221225." In still another example, the numerical PII data 1506 can include a latitude and longitude "14.33278, −8.27297" and the standardization service 104 can perform a hashing operation to convert the latitude and longitude into a geohash "56401366872." At step 1509, the hash processor 107 applies one or more cryptographic key derivation (CKD) functions to the standardized numerical PII data 1506 to generate a derived key 1508, such as, for example, a 256-bit length cryptographic key.

At step 1511, the hash processor 107 concatenates the FXR 1504 and the derived key 1508 to generate a concatenated FXR 1510.

At step 1513, the hash processor 107 generates one or more fuzzy tokens 1514 based on the concatenated FXR 1510 and a secret key 1512. The hash processor 107 can generate the fuzzy token 1510 according to one or more embodiments described and/or incorporated by reference herein. The secret key 1512 can include any secret information, such as, for example, a cryptographic key, the derived key 1508, a password, personal identification number (PIN), keyword, key phrase, device identifier, network identifier, or biometric information (e.g., face scan, handprint, fingerprint, iris scan, voice recording, etc.). The hash processor 107 can perform step 1513 similar to step 1307 of the encoding workflow 1300A described herein and shown in FIG. 13A.

The encoding workflow 1500 can include performing one or more appropriate actions following generation of the fuzzy token 1514. Non-limiting examples of appropriate actions include transmitting and/or storing the fuzzy token 1514, generating a user account and/or validating a user account based on the fuzzy token 1514, performing an identification or validation to determine or verify an identity of a subject with which the fuzzy token 1514 is associated, causing a locking mechanism to unlock or lock, causing a gateway to be opened or closed (e.g., a physical gateway, such as a door, or a digital gateway, such as access to a particular set of computing resources), providing a subject access to a particular computing environment or networking address, initiating financial transactions, providing digital signatures, generating and transmitting scannable media, or any other action as will occur to one of ordinary skill in the art.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a general purpose computer, special purpose computer, specially-configured computer, mobile device, etc.

When information is transferred or provided over a network or another communications connection (either hardwired, wireless, or a combination of hardwired or wireless) to a computer, the computer properly views the connection as a computer-readable medium. Thus, any such connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the embodiments of the claimed systems may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multiprocessor systems, microprocessor-based or programmable consumer electronics, networked PCs, minicomputers, mainframe computers, and the like. Embodiments of the claimed system are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the systems are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the system is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed systems will be readily discernible from the description herein, by those of ordinary skill in the art. Many embodiments and adaptations of the disclosure and claimed systems other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed systems. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems. In addition, some steps may be carried out simultaneously, contemporaneously, or in synchronization with other steps.

Aspects, features, and benefits of the claimed devices and methods for using the same will become apparent from the information disclosed in the exhibits and the other applications as incorporated by reference. Variations and modifications to the disclosed systems and methods may be effected without departing from the spirit and scope of the novel concepts of the disclosure.

It will, nevertheless, be understood that no limitation of the scope of the disclosure is intended by the information disclosed in the exhibits or the applications incorporated by reference; any alterations and further modifications of the described or illustrated embodiments, and any further applications of the principles of the disclosure as illustrated therein are contemplated as would normally occur to one skilled in the art to which the disclosure relates.

The foregoing description of the exemplary embodiments has been presented only for the purposes of illustration and description and is not intended to be exhaustive or to limit the devices and methods for using the same to the precise forms disclosed. Many modifications and variations are possible in light of the above teaching.

The embodiments were chosen and described in order to explain the principles of the devices and methods for using the same and their practical application so as to enable others skilled in the art to utilize the devices and methods for using the same and various embodiments and with various modifications as are suited to the particular use contemplated. Alternative embodiments will become apparent to those skilled in the art to which the present devices and methods for using the same pertain without departing from their spirit and scope. Accordingly, the scope of the present devices and methods for using the same is defined by the appended claims rather than the foregoing description and the exemplary embodiments described therein.

What is claimed is:

1. An encoding system, comprising:
   at least one processor in communication with at least one data store;
   the at least one data store; and
   a non-transitory, machine-readable memory device comprising instructions stored thereon that, when executed by the at least one processor, cause the at least one processor to:
   obtain personal identifiable information (PII) data;
   segregate the PII data into two or more secondary representations;
   generate a plurality of co-occurrence matrices based on the two or more secondary representations;
   perform a convolution between each of the plurality of co-occurrence matrices and one of a plurality of Gaussian kernels, wherein each of the plurality of Gaussian kernels comprises a different width;
   generate a tertiary representation of the PII data by performing a linear combination of the plurality of co-occurrence matrices;
   generate at least one vector based on the tertiary representation of the PII data;
   perform a lossy tokenization process on the at least one vector to generate at least one token; and
   store the at least one token at the data store.

2. The system of claim 1, wherein the instructions, when executed by the at least one processor, further cause the at least one processor to convert the PII data to a string format prior to segregating the PII data.

3. The system of claim 1, wherein the instructions, when executed by the at least one processor, further cause the at least one processor to:
   compare the at least one token to at least one other token stored at the data store;
   based on the comparison, determine that the at least one token is within a similarity threshold of the at least one other token; and
   transmit, to a computing device, a positive verification of a subject associated with the at least one other token.

4. The system of claim 1, wherein the instructions, when executed by the at least one processor, further cause the at least one processor to, prior to generating the tertiary representation of the PII data, apply one of a plurality of weight values to each of the plurality of co-occurrence matrices.

5. The system of claim 4, wherein:
   individual values of the plurality of weight values are each associated with one of a plurality of categories; and
   the instructions, when executed by the at least one processor, further cause the at least one processor to:
   classify each of the plurality of co-occurrence matrices into one of the plurality of categories; and
   apply the one of the plurality of weight values to each of the plurality of co-occurrence matrices by applying the individual value of the plurality of weight values corresponding to the one of the plurality of categories into which the co-occurrence matrix was classified.

6. The system of claim 5, wherein:
   the plurality of categories comprises a first name category, a last name category, and a middle name category; and
   individual values of the plurality of weight values that are associated with first name category or the last name category are greater than individual values of the plurality of weight values associated with the middle name category.

7. The system of claim 4, wherein the plurality of weight values are equal.

8. The system of claim 7, wherein, prior to performing the convolution, the plurality of co-occurrence matrices are identical.

9. A non-transitory, computer-readable medium comprising instructions that, when executed by a computer, cause the computer to:
   obtain personal identifiable information (PII) data;
   segregate the PII data into two or more secondary representations;
   generate a plurality of co-occurrence matrices based on the two or more secondary representations;
   perform a convolution between each of the plurality of co-occurrence matrices and one of a plurality of Gaussian kernels, wherein each of the plurality of Gaussian kernels comprises a different width;
   generate a tertiary representation of the PII data by performing a linear combination of the plurality of co-occurrence matrices;
   generate at least one vector based on the tertiary representation of the PII data;
   perform a lossy tokenization process on the at least one vector to generate at least one token; and
   store the at least one token at the data store.

10. The non-transitory, computer-readable medium of claim 9, wherein the instructions, when executed by the computer, cause the computer to:
    generate scannable media based on the at least one token; and
    transmit the scannable media to a computing device.

11. The non-transitory, computer-readable medium of claim 9, wherein the instructions, when executed by the computer, cause the computer to convert the PII data to a string format prior to segregating the PII data.

12. The non-transitory, computer-readable medium of claim 9, wherein the instructions, when executed by the computer, cause the computer to:
    compare the at least one token to at least one other token stored at the data store;
    based on the comparison, determine that the at least one token is within a similarity threshold of the at least one other token; and
    transmit, to a computing device, a positive verification of a subject associated with the at least one other token.

13. The non-transitory, computer-readable medium of claim 9, wherein the instructions, when executed by the computer, cause the computer to, prior to generating the tertiary representation of the PII data, apply one of a plurality of weight values to each of the plurality of co-occurrence matrices.

14. The non-transitory, computer-readable medium of claim 13, wherein the instructions, when executed by the computer, cause the computer to:
    classify each of the plurality of co-occurrence matrices into one of a plurality of categories, wherein individual values of the plurality of weight values are each associated with one of a plurality of categories; and
    apply the one of the plurality of weight values to each of the plurality of co-occurrence matrices by applying the individual value of the plurality of weight values corresponding to the one of the plurality of categories into which the co-occurrence matrix was classified.

* * * * *